(12) United States Patent
Pusdesris et al.

(10) Patent No.: US 11,693,666 B2
(45) Date of Patent: Jul. 4, 2023

(54) RESPONDING TO BRANCH MISPREDICTION FOR PREDICATED-LOOP-TERMINATING BRANCH INSTRUCTION

(71) Applicant: Arm Limited, Cambridge (GB)

(72) Inventors: Joseph Michael Pusdesris, Austin, TX (US); Nicholas Andrew Plante, Austin, TX (US); Yasuo Ishii, Austin, TX (US); Chris Abernathy, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/505,854

(22) Filed: Oct. 20, 2021

(65) Prior Publication Data

US 2023/0120596 A1    Apr. 20, 2023

(51) Int. Cl.
  *G06F 9/38*    (2018.01)
  *G06F 9/30*    (2018.01)
  *G06F 9/345*   (2018.01)

(52) U.S. Cl.
  CPC ........ *G06F 9/3861* (2013.01); *G06F 9/30018* (2013.01); *G06F 9/30072* (2013.01); *G06F 9/30101* (2013.01); *G06F 9/3455* (2013.01); *G06F 9/3844* (2013.01); *G06F 9/3848* (2013.01); *G06F 9/3859* (2013.01)

(58) Field of Classification Search
  CPC .. G06F 9/30018; G06F 9/3844; G06F 9/3848; G06F 9/3806; G06F 9/3861; G06F 9/30072; G06F 9/3859; G06F 9/30065
  See application file for complete search history.

(56) References Cited

U.S. PATENT DOCUMENTS

| 5,740,419 | A | * | 4/1998 | Potter | G06F 9/3842 |
| | | | | | 712/E9.05 |
| 5,774,711 | A | * | 6/1998 | Henry | G06F 9/3861 |
| | | | | | 712/E9.034 |
| 5,909,573 | A | * | 6/1999 | Sheaffer | G06F 9/3806 |
| | | | | | 712/240 |
| 6,003,128 | A | * | 12/1999 | Tran | G06F 9/3844 |
| | | | | | 712/241 |

(Continued)

*Primary Examiner* — Keith E Vicary
(74) *Attorney, Agent, or Firm* — Nixon & Vanderhye P.C.

(57) ABSTRACT

A predicated-loop-terminating branch instruction controls, based on whether a loop termination condition is satisfied, whether the processing circuitry should process a further iteration of a predicated loop body or process a following instruction. If at least one unnecessary iteration of the predicated loop body is processed following a mispredicted-non-termination branch misprediction when the loop termination condition is mispredicted as unsatisfied for a given iteration when it should have been satisfied, processing of the at least one unnecessary iteration of the predicated loop body is predicated to suppress an effect of the at least one unnecessary iteration. When the mispredicted-non-termination branch misprediction is detected for the given iteration of the predicated-loop-terminating branch instruction, in response to determining that a flush suppressing condition is satisfied, flushing of the at least one unnecessary iteration of the predicated loop body is suppressed as a response to the mispredicted-non-termination branch misprediction.

20 Claims, 11 Drawing Sheets

(56) References Cited

U.S. PATENT DOCUMENTS

| | | | | |
|---|---|---|---|---|
| 6,032,252 | A * | 2/2000 | Petro | G06F 9/325 |
| | | | | 712/241 |
| 7,366,885 | B1 * | 4/2008 | Radhakrishnan | G06F 9/381 |
| | | | | 712/E9.058 |
| 10,275,249 | B1 * | 4/2019 | Richins | G06F 9/325 |
| 2004/0230782 | A1 * | 11/2004 | Busaba | G06F 9/325 |
| | | | | 712/241 |
| 2005/0138341 | A1 * | 6/2005 | Maiyuran | G06F 9/325 |
| | | | | 712/E9.055 |
| 2009/0327674 | A1 * | 12/2009 | Codrescu | G06F 9/325 |
| | | | | 712/241 |
| 2010/0064122 | A1 * | 3/2010 | Henry | G06F 9/30065 |
| | | | | 712/E9.032 |
| 2020/0167164 | A1 * | 5/2020 | Jarvis | G06F 9/325 |
| 2021/0200550 | A1 * | 7/2021 | Sivtsov | G06F 9/3806 |

* cited by examiner

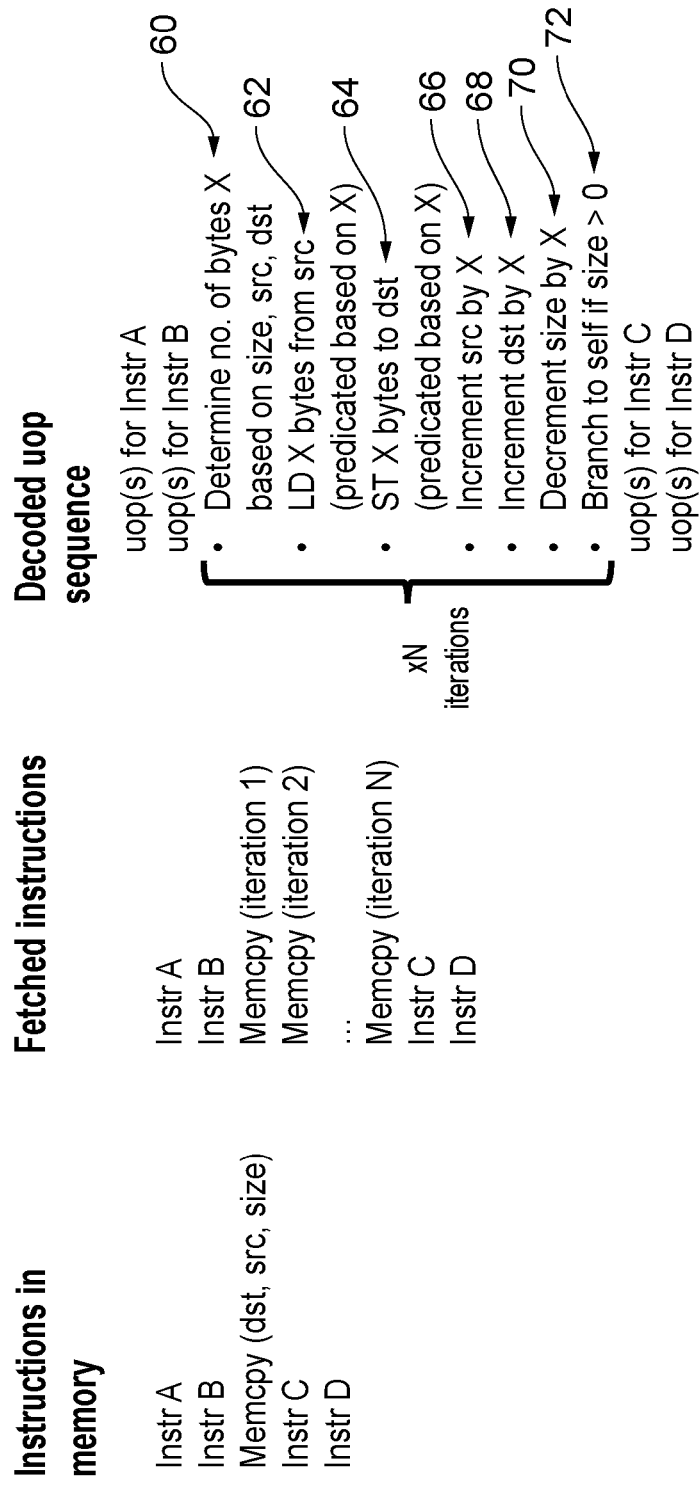
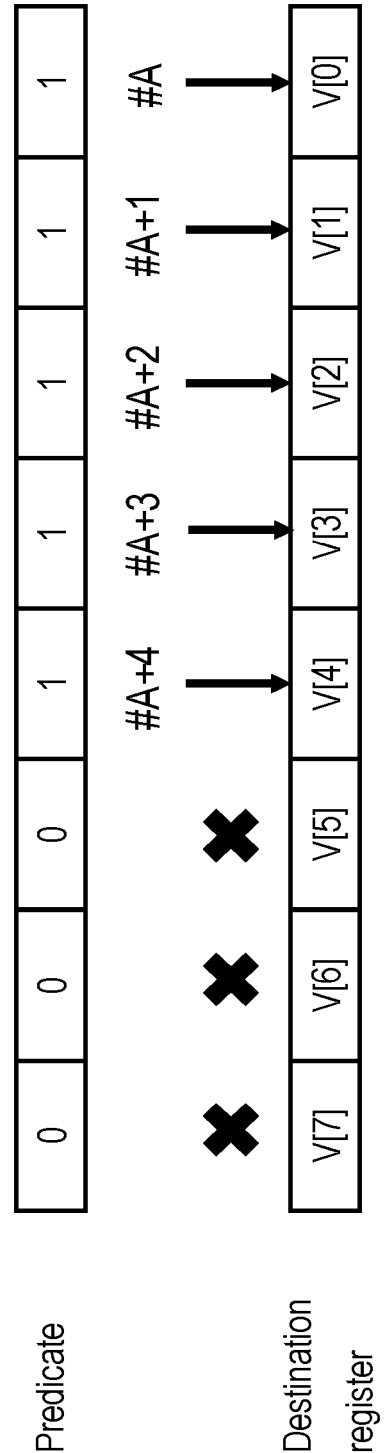
FIG. 2
FIG. 3

RESPONDING TO BRANCH MISPREDICTION FOR PREDICATED-LOOP-TERMINATING BRANCH INSTRUCTION

BACKGROUND

Technical Field

The present technique relates to the field of data processing.

Technical Background

A data processing apparatus may have branch prediction circuitry for predicting outcomes of branch instructions. This can help to improve performance by allowing subsequent instructions beyond the branch to be fetched for decoding and execution before the actual outcome of the branch is determined.

SUMMARY

At least some examples provide an apparatus comprising:
processing circuitry to perform data processing in response to decoded instructions; and
branch prediction circuitry to perform branch prediction to predict outcomes of branch instructions, and based on the branch prediction, to control fetching of instructions to be decoded for processing by the processing circuitry; and
branch misprediction detection circuitry to detect branch misprediction for a predicated-loop-terminating branch instruction for controlling, based on whether a loop termination condition is satisfied, whether the processing circuitry should process a further iteration of a predicated loop body or process a following instruction to be processed after a final iteration of the predicated loop body, for which, if at least one unnecessary iteration of the predicated loop body is processed following a mispredicted-non-termination branch misprediction when the loop termination condition is mispredicted as unsatisfied for a given iteration of the predicated-loop-terminating branch instruction when the loop termination condition should have been satisfied, processing of the at least one unnecessary iteration of the predicated loop body is predicated to suppress an effect of the at least one unnecessary iteration of the predicated loop body; in which:
in response to detecting the mispredicted-non-termination branch misprediction for the given iteration of the predicated-loop-terminating branch instruction, the branch misprediction detection circuitry is configured to:
determine whether a flush suppressing condition is satisfied; and
in response to determining that the flush suppressing condition is satisfied, suppress flushing of the at least one unnecessary iteration of the predicated loop body as a response to the mispredicted-non-termination branch misprediction, to allow the processing circuitry to continue to process the at least one unnecessary iteration despite the mispredicted-non-termination branch misprediction being detected.

At least some examples provide a method comprising:
performing branch prediction to predict outcomes of branch instructions, and based on the branch prediction, controlling fetching of instructions to be decoded for processing by processing circuitry;
in response to the decoded instructions, performing data processing using the processing circuitry;
detecting branch misprediction for a predicated-loop-terminating branch instruction for controlling, based on whether a loop termination condition is satisfied, whether the processing circuitry should process a further iteration of a predicated loop body or process a following instruction to be processed after a final iteration of the predicated loop body, for which, if an unnecessary iteration of the predicated loop body is processed following the loop termination condition being mispredicted as unsatisfied for an iteration of the predicated-loop-terminating branch instruction when the loop termination condition should have been satisfied, processing of the unnecessary iteration of the predicated loop body is predicated to suppress an effect of the unnecessary iteration of the predicated loop body; and
in response to detecting a mispredicted-non-termination branch misprediction for a given iteration of the predicated-loop-terminating branch instruction for which the loop termination condition is mispredicted as unsatisfied when the loop termination condition should have been satisfied:
determining whether a flush suppressing condition is satisfied; and
in response to determining that the flush suppressing condition is satisfied, suppressing flushing of one or more unnecessary iterations of the predicated loop body as a response to the mispredicted-non-termination branch misprediction, to allow the processing circuitry to continue to process the one or more unnecessary iterations despite the mispredicted-non-termination branch misprediction being detected.

At least some examples provide a non-transitory computer-readable medium to store computer-readable code for fabrication of an apparatus comprising:
processing circuitry to perform data processing in response to decoded instructions; and
branch prediction circuitry to perform branch prediction to predict outcomes of branch instructions, and based on the branch prediction, to control fetching of instructions to be decoded for processing by the processing circuitry; and
branch misprediction detection circuitry to detect branch misprediction for a predicated-loop-terminating branch instruction for controlling, based on whether a loop termination condition is satisfied, whether the processing circuitry should process a further iteration of a predicated loop body or process a following instruction to be processed after a final iteration of the predicated loop body, for which, if an unnecessary iteration of the predicated loop body is processed following the loop termination condition being mispredicted as unsatisfied for an iteration of the predicated-loop-terminating branch instruction when the loop termination condition should have been satisfied, processing of the unnecessary iteration of the predicated loop body is predicated to suppress an effect of the unnecessary iteration of the predicated loop body; in which:
in response to detecting a mispredicted-non-termination branch misprediction for a given iteration of the predicated-loop-terminating branch instruction for which the loop termination condition is mispredicted as unsatisfied when the loop termination condition should have been satisfied, the branch misprediction detection circuitry is configured to:
determine whether a flush suppressing condition is satisfied; and
in response to determining that the flush suppressing condition is satisfied, suppress flushing of one or more unnecessary iterations of the predicated loop body as a response to the mispredicted-non-termination branch misprediction, to allow the processing circuitry to continue to process the one or more unnecessary iterations despite the mispredicted-non-termination branch misprediction being detected.

Further aspects, features and advantages of the present technique will be apparent from the following description of examples, which is to be read in conjunction with the accompanying drawings.

BRIEF DESCRIPTION OF THE DRAWINGS

FIG. 2 illustrates an example of executing code including a memory copy (memcpy) instruction;

FIG. 3 illustrates an example of a predicated load micro-operation;

DESCRIPTION OF EXAMPLES

Figure 1:
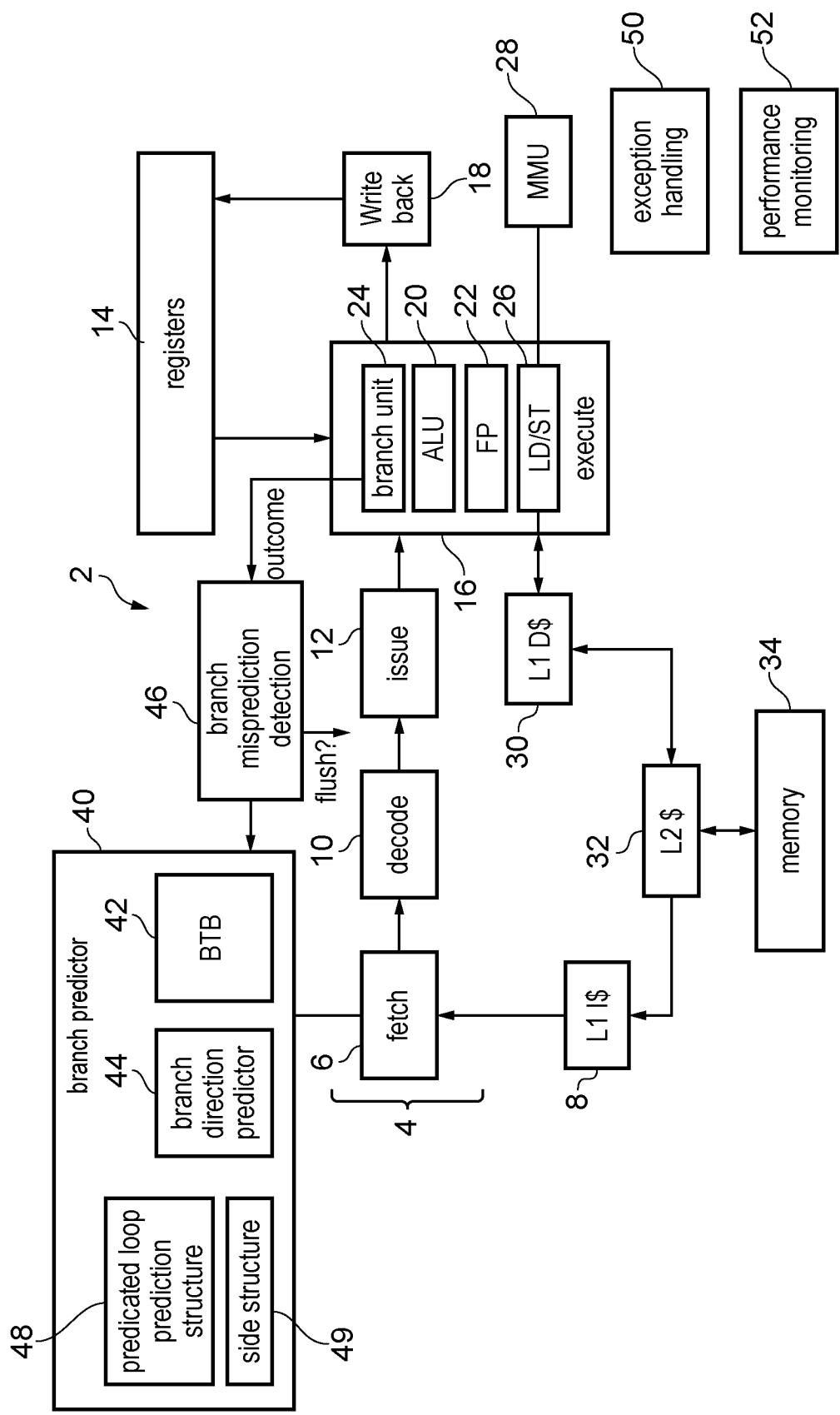
FIG. 1 schematically illustrates an example of a data processing apparatus.

An apparatus has processing circuitry to perform data processing in response to decoded instructions, and branch prediction circuitry to perform branch prediction to predict outcomes of branch instructions. Based on the branch prediction, the branch prediction circuitry controls fetching of instructions to be decoded for processing by the processing circuitry. For example, the branch prediction circuitry may supply information that can be used to generate a stream of instruction fetch addresses which can be used by fetch circuitry to initiate requests to fetch the instructions from an instruction cache or memory. Branch misprediction detection circuitry can be provided to detect and respond to branch mispredictions, when the branch prediction circuitry predicts the wrong outcome for a branch instruction.

The processing circuitry may support a predicated-loop-terminating branch instruction for controlling, based on whether a loop termination condition is satisfied, whether the processing circuitry should process a further iteration of a predicated loop body or process a following instruction to be processed after a final iteration of the predicated loop body. The branch prediction circuitry can predict, for a given instance of the predicated-loop-terminating branch instruction, whether the loop termination condition is satisfied. Hence, the branch prediction circuitry could sometimes make a non-termination prediction, indicating that the loop termination condition is not satisfied, and hence that a further iteration of the predicated loop body should be performed after the current iteration. Other times, the branch prediction circuitry could make a termination prediction, indicating that the loop termination condition is satisfied, and hence that the processing circuitry should move on to process the following instruction after the current iteration of the predicated loop body.

However, it is possible that the branch prediction circuitry could mispredict the outcome of the predicated-loop-terminating branch instruction. The misprediction could be a mispredicted-non-termination prediction, when the loop termination condition is mispredicted as unsatisfied for a given iteration of the predicated-loop-terminating branch instruction, but the loop termination condition should actually have been satisfied. That is, the mispredicted-non-termination prediction is an occasion when the branch prediction circuitry incorrectly made the non-termination prediction for the predicated-loop-terminating branch instruction, so that at least one unnecessary iteration of the predicated loop body may be fetched for processing after the iteration at which the loop should have been terminated. Alternatively, the misprediction could be a mispredicted-termination prediction, when the loop termination condition is mispredicted as satisfied for a given iteration of the predicated-loop-terminating branch instruction, but the loop termination condition should actually have been not satisfied. That is, the mispredicted-termination prediction is an occasion when the branch prediction circuitry incorrectly made the termination prediction for the predicated-loop-terminating branch instruction, so that the loop was terminated too early.

The loop body is a "predicated" loop body because the operation (or operations) to be performed in the predicated loop body are such that if at least one unnecessary iteration of the predicated loop body is processed following the mispredicted-non-termination branch misprediction (when the loop termination condition is mispredicted as unsatisfied for a given iteration of the predicated-loop-terminating branch instruction when the loop termination condition should have been satisfied), processing of the at least one unnecessary iteration of the predicated loop body is predicated to suppress an effect of the at least one unnecessary iteration of the predicated loop body. For example, the predicated loop body could use a certain variable to track whether the loop should be terminated and once that variable reaches the condition in which the loop should be terminated then other operations in that predicated loop body may in any case have their operations predicated based on that variable. For example, this could be useful if the predicated loop body uses a variable to track a number of remaining units of data to be processed and terminate the loop when no remaining units of data are to be processed, and other operations within the predicated loop body are predicated based on the number of remaining units of data to be processed, so that if the number of remaining units of data has reached zero then those other operations would in any case have their effect suppressed.

Such a predicated-loop-terminating branch instruction can be extremely hard to predict for the branch prediction circuitry, because the number of required iterations in the loop as a whole may vary from one instance of performing the entire loop to another instance of performing the entire loop, for example based on data dependent variables. Therefore, the misprediction rate for such predicated-loop-terminating branch instructions can be high. In typical branch prediction schemes, the usual approach for resolving branch mispredictions may be to flush the incorrectly fetched instructions from a processing pipeline, where the flushed instructions are the instructions which are younger than the mispredicted branch operation, and then to resume fetching of instructions from the correct instruction which should have been processed after the branch based on the correct branch outcome.

However, the inventors recognised that, for the predicated-loop-terminating branch instruction, sometimes it can be better for performance to avoid flushing the instructions which were fetched after an mispredicted predicated-loop-terminating branch instruction. As the predicated loop body is predicated so that, if at least one unnecessary iteration of the predicated loop body is processed following a mispredicted-non-termination branch misprediction, the effect of the at least one unnecessary iteration will in any case be suppressed, so there is no need to flush a processing pipeline of instructions or micro-operations that relate to at least one unnecessary iteration of the predicated loop body that was incorrectly fetched based on the non-termination prediction made by the branch prediction circuitry for the given iteration of the predicated-loop-terminating branch instruction (the micro-operations represent the decoded form of the instructions fetched from an instruction cache or memory— in some implementations the micro-operations could be exactly the same as the instructions, or alternatively for other iterations the micro-operations can differ in number and/or format compared to the fetched program instructions). The instructions or micro-operations associated with the at least one unnecessary iteration can be allowed to remain in the pipeline as they would not affect the architecturally correct processing results. It is recognised that in certain scenarios, flushing all the instructions or micro-operations associated with the at least one unnecessary iteration may actually delay the processing of the following instruction for longer than if the at least one unnecessary iteration is allowed to proceed (with its operation suppressed based on predication).

Therefore, in response to detecting the mispredicted-non-termination branch misprediction for the given iteration of the predicated-loop-terminating branch instruction, the branch misprediction detection circuitry determines whether a flush suppressing condition satisfied. In response to determining that the flush suppressing condition is satisfied, the branch misprediction detection circuitry suppresses flushing of the at least one unnecessary iteration of the predicated loop body as a response to the mispredicted-non-termination branch misprediction, to allow the processing circuitry to continue to process the at least one unnecessary iteration despite the mispredicted-non-termination branch misprediction being detected. This can reduce the latency penalty associated with the mispredicted-non-termination branch misprediction, and hence improve performance.

In some examples, the predicated-loop-terminating branch instruction may be an instruction which causes a backwards branch to a target address conditional on whether a loop termination condition is satisfied, where all instructions within the loop (between the target address and the instruction causing the backwards branch) are predicated so that they have no architectural effect when executed if the loop termination condition is satisfied. The instruction could be an explicit branch instruction or another type of instruction which implicitly also causes a branch to be performed.

The predicated-loop-terminating branch instruction could also be a forwards branch (conditional on the loop termination condition being satisfied) to a target address after the end of the loop body, where a subsequent unconditional branch instruction is located at the end of the loop body to branch unconditionally to a target address at or before the predicated-loop-terminating branch instruction and all instructions within the loop (between the target address of the unconditional branch and the unconditional branch instruction itself) are predicated so that they have no architectural effect when executed if the loop termination condition is satisfied.

The predicated-loop-terminating branch instruction could also be an instruction which branches to itself if the loop termination condition is not satisfied, where the instruction also causes the operations of the loop body to be performed and those operations are predicated to have no architectural effect if executed when the loop termination condition is satisfied.

In general, the flush suppressing condition may be a condition which is dependent on the number of unnecessary iterations of the predicated loop body predicted by the branch prediction circuitry to be required following the mispredicted-non-termination branch misprediction. When the number of unnecessary iterations is relatively small then the following instruction which should be processed after the loop terminates may already have been fetched at the point when the mispredicted-non-termination branch misprediction is identified for the given iteration of the predicated-loop-terminating branch instruction, and so in this case the following instruction can be processed earlier if the flush is suppressed than if the flush of younger operations than the mispredicted predicated-loop-terminating branch instruction was initiated. However, when the number of unnecessary iterations to be processed is larger then the following instruction may not yet have been fetched at the point when the mispredicted-non-termination branch misprediction is identified and so in that case it may be preferable to perform the flushing of operations younger than the mispredicted predicated-loop-terminating branch instruction.

Although the flush suppressing condition may depend on the number of unnecessary iterations predicted by the branch prediction circuitry to be required, there may be various ways in which the flush suppressing condition can actually be detected, which does not necessarily need to involve checking of the number of unnecessary iterations. For example, the branch misprediction detection circuitry could determine that the flush suppressing condition is satisfied when any one or more of the following conditions are satisfied at the time the mispredicted-non-termination branch misprediction is identified:

the branch misprediction detection circuitry determines that fewer than a predetermined number of unnecessary iterations of the predicated loop body will be processed after the given iteration for which the mispredicted-non-termination branch misprediction was detected; and/or the branch prediction circuitry has already predicted the loop termination condition to be satisfied for a subsequent iteration of the predicated-loop-terminating branch instruction after the given iteration; and/or the following instruction to be processed after the final iteration of the predicated loop body has already been fetched for processing by the processing circuitry.

If any of these conditions is satisfied at the time when the mispredicted-non-termination branch misprediction is identified, then this may be an indication that the number of unnecessary iterations will be relatively small and that therefore it may be preferable to suppress flushing of the at least one unnecessary iteration.

The effect of the unnecessary iteration suppressed by predication may be an update of data in memory and/or an update of at least one destination register. Hence, the suppressed effect may be the architectural effects of processing of the unnecessary iteration, such as the results of processing of the unnecessary iteration which are prescribed in the instruction set architecture supported by the processing circuitry. It will be appreciated that even when the effect of the unnecessary iterations is suppressed by predication, there may still be some other micro-architectural effects of processing the unnecessary iteration that can still take place, such as updating of register renaming mappings, updating of control state such as instruction tracking information within an issue queue or reorder buffer, etc.

Even when the direct architectural effects (such as updates to destination registers and memory) of the predicated operations within an unnecessary iteration of the predicated loop body are suppressed, there could be other indirect ways in which the effects of the unnecessary iteration of the predicated loop body could become visible to software or to the user of the apparatus. In some implementations, this may be considered acceptable and it may not be necessary to take further action to hide those indirect consequences of the unnecessary iteration of the predicated loop body being processed on the predication following a branch misprediction. However, other implementations may consider this unacceptable and may wish to take actions to hide not only the direct architectural effects of the predicated operations, but also indirect architecturally-visible effects.

One example of such an indirect architecturally visible effect could be the updating of performance monitoring information tracked by a performance counter. Performance monitoring circuitry could maintain a performance counter indicative of a count of occurrences of a given event. For example, the performance counter could be tracking the number of executed instructions or micro-operations, so the given event could be the processing of an instruction or micro-operation. Hence, if the performance counter continues to increment in response to occurrences of the given event which occur as a consequence of executing the at least one unnecessary iteration of the predicated loop body under predication, then even if the direct architectural effects of the unnecessary iteration are suppressed by the predication, the fact that the at least one unnecessary iteration of the predicated loop body was executed (in contravention to the architecturally defined function of the predicated-loop-terminating branch instruction) may be indirectly visible by analysing the performance monitoring data gathered by the performance counter. Hence, to prevent the architecturally-incorrect execution of the unnecessary iteration becoming visible through the performance monitoring, in some implementations, in response to detecting the mispredicted-non-termination branch misprediction when the flush suppressing condition is determined to satisfied, the branch misprediction detection circuitry may control the performance monitoring circuitry to prevent occurrences of the given event arising due to processing of the one or more unnecessary iterations contributing to the count indicated by the performance counter.

Another example of an indirect consequence of executing the at least one unnecessary iteration becoming architecturally visible to software could arise if an exception is taken during processing of the at least one unnecessary iteration. The exception could be a software-triggered exception or fault arising from the operations requested by the software being executed, or could be a hardware-triggered interrupt which is based on an interrupt signal received, e.g. due to an externally occurring event independent of the operation of the software, such as a button being pressed by the user of the apparatus, or a message or signal being received from an external device. Hence, the term "exception" is used here to encompass both exceptions and interrupts.

Typically, when an exception is taken, an address representing the current point of program flow at which the exception was taken may be set as a return address, so that when exception handling finishes processing can resume from the instruction identified by the return address. Hence, if an exception is taken during processing of the at least one unnecessary iteration, the normal approach to exception handling would be to record the address of the currently executing instruction associated with that at least one unnecessary iteration as the return address. Also, on taking the exception, register state may be saved to memory to preserve it so that it can be restored when resuming processing after the exception has been handled, and that register state may include variables which indicate that the at least one unnecessary iteration should not actually have been processed (e.g. the variable controlling the evaluation of the loop termination condition may have a value which shows that the current iteration should not have executed). Based on that register state, software may be able to identify that at least one unnecessary iteration was executed incorrectly, contravening the architectural definition of the behaviour expected for the predicated-loop-terminating branch instruction. While in some cases this may be considered acceptable, other implementations may preferred not to allow software to gain visibility of register state which indicates a behaviour not consistent with the requirements of the instruction set architecture. To prevent this, exception handling circuitry may be responsive to an exception being taken during processing of the at least one unnecessary iteration of the predicated loop body to set, as a return address from which program flow is to be resumed after processing of the exception, an address corresponding to the following instruction to be processed after the final iteration of the predicated loop body. This means that, following handling of the exception, program flow may then resume from the following instruction, rather than returning to perform at least one unnecessary iteration. As well as hiding the architecturally-incorrect execution of the unnecessary iteration from the software or user of the apparatus, this approach also has the advantage that following handling of the exception the following instruction can be processed sooner because it does not need to wait for at least one unnecessary iteration of the predicated loop body to be fetched and processed.

At least one of the processing circuitry and the branch misprediction detection circuitry may be able to determine the total number of iterations of the predicated loop body required to be processed, based on operands associated with a first iteration of the predicated loop body. Hence, while the total number of required iterations may depend on the specific operands provided for the first iteration of the predicated loop body, so that it may be relatively difficult for the branch prediction circuitry to correctly predict the number of required iterations before the first iteration is processed, because one instance of encountering the loop may have different operands to another, once the first iteration of the predicated loop body is processed then the operands could be analysed to determine how many iterations are required in total. This property can be exploited to improve performance by enabling some actions to be triggered earlier than might otherwise be possible.

For example, the branch prediction circuitry can predict, based on the total number of iterations determined using the operands associated with the first iteration of the predicated loop body, whether the loop termination condition is satisfied for at least one subsequent iteration of the predicated-loop-terminating branch instruction. The branch prediction circuitry can make this prediction without needing to wait for the at least one subsequent iteration of the predicated-loop-terminating branch instruction to actually be encountered, so could initiate some actions associated with the prediction for the subsequent iteration of the predicated-loop-terminating branch instruction early.

Also, since the required number of iterations for the current instance of the predicated loop can be determined accurately based on the operands associated with the first iteration of the predicated loop body, this means that other techniques for predicting the outcome of a given iteration of the predicated-loop-terminating branch instruction are likely to be less accurate and so it may be desirable to disable those alternative prediction mechanisms once the required number of iterations has been determined based on the first iteration of the predicated loop body.

For example, the branch prediction circuitry may maintain branch direction prediction state associated with an address of the predicated-loop-terminating branch instruction, which may be learned from previous attempts to perform the entire loop associated with the predicated-loop-terminating branch instruction (this branch direction prediction state could be specific to predicting termination of a predicated loop, or could be generic branch direction prediction state maintained for branch instructions in general including branches other than a predicated-loop-terminating branch instruction). For example, the branch direction prediction state could correlate an address of the predicated-loop-terminating branch instruction with a prediction of the branch termination outcome for a particular iteration of the predicated loop. This may have been learnt from a previous attempt to perform the entire loop, but may not necessarily be correct for a subsequent attempt because the operands of the first iteration of the predicated loop body may be different on the subsequent attempt. Nevertheless, initially it can be useful to use that branch direction prediction state to predict outcomes of the predicated-loop-terminating branch instruction for a number of iterations, so that fetching of further iterations or subsequent instructions can be initiated before the instruction or micro-operation associated with the first iteration of the predicated loop body has reached the execute stage at which the required number of iterations for the loop as a whole can be determined based on the operands associated with the first iteration. For example, the operands associated with the first iteration of the predicated loop body may not be available to the branch prediction circuitry initially as they may still need to be calculated based on earlier instructions that are waiting processing. Hence, for the intervening time between the branch prediction circuitry making the prediction for an address of the predicated-loop-terminating branch instruction and the first iteration of the predicated loop body being processed, predictions may be based on the branch direction prediction state which has been learnt from previous attempts to execute the loop.

However, once the first iteration of the predicated loop body is processed using its operands, the processing circuitry or the branch misprediction detection circuitry can determine the total number of iterations of the predicated loop body required to be processed, and this indication is likely to be more accurate than any further predictions possible based on the branch direction prediction state associated with an address of the predicated-loop-terminating branch instruction that was obtained prior to encountering the first iteration of the predicated-loop-terminating branch instruction for the current attempt at executing the entire loop. Therefore, it may be preferable to disable further predictions based on the branch direction prediction state obtained prior to the first iteration, and instead predict outcomes of subsequent iterations of the predicated-loop-terminating branch instruction based on the determined total number of iterations identified by the processing circuitry or the branch misprediction detection circuitry in response to the first iteration of the predicated loop body.

Therefore, for the at least one subsequent iteration of the predicated-loop-terminating branch instruction for which the prediction of whether the loop termination condition is satisfied is based on the total number of iterations, the branch prediction circuitry can predict whether the loop termination condition is satisfied independent of branch direction prediction state associated with an address of the predicated-loop-terminating branch instruction that was obtained prior to encountering a first iteration of the predicated-loop-terminating branch instruction. This approach can help to reduce the likelihood of back-to-back branch mispredictions which could otherwise arise if the required number of iterations varies between different attempts at executing the same loop. It can also help to save power because lookups of the branch direction prediction state can be suppressed once the total number of iterations expected for the current instance of the loop has been determined following processing of the first iteration of the current instance of the loop.

The branch misprediction detection circuitry can also perform early detection, based on operands associated with a first iteration of the predicated loop body, of whether there is a branch misprediction for one or more subsequent iterations of the predicated-loop-terminating branch instruction following a first iteration of the predicated-loop-terminating branch instruction. Hence, it is not necessary to wait for the mispredicted iteration of the predicated-loop-terminating branch instruction to actually be encountered before initiating a response to the misprediction. The response to the branch misprediction for the subsequent iteration can be initiated earlier in response to processing of the first iteration, to reduce the delay caused by the misprediction.

Hence, in response to the early detection detecting a mispredicted-termination branch misprediction for a given subsequent iteration of the predicated-loop-terminating branch instruction for which the loop termination condition is mispredicted as being satisfied when the loop termination condition should have been unsatisfied, the branch misprediction detection circuitry can trigger, at a timing when at least one older iteration than the given subsequent iteration remains to be processed, an early pipeline flush of operations following the given subsequent iteration of the predicated-loop-terminating branch instruction. By triggering the pipeline flush early, before the instruction or micro-operation which was actually mispredicted reaches the processing stage at which the misprediction can be detected based on the operands of that instruction or micro-operation, the delay until the correct instruction or micro-operation can be processed can be reduced.

To trigger the early flush, the branch misprediction detection circuitry can determine the flush point beyond which instructions or micro-operations should be fetched, which will be at a future point of program flow which is not the latest instruction or micro-operation to have been executed. Hence, the branch misprediction detection circuitry may determine how many intervening instructions or micro-operations are in the pipeline between the currently executed instruction or micro-operation at the head of the pipeline and the instruction at the flush point. To enable such determination of the flush point, it can be useful that, when instruction decoding circuitry decodes fetched instructions to generate micro-operations to be processed by the processing circuitry, the predicated loop body corresponds to a fixed number of micro-operations to be processed by the processing circuitry, the fixed number being the same for each iteration of the predicated loop body. This means that the branch misprediction detection circuitry can detect the point from which instructions or micro-operation should be flushed from the pipeline based on the fixed number and the number of additional iterations determined to have been processed after the iteration at which the loop was incorrectly predicted to have terminated, even though the operation at the flush point has not yet reached the execute stage of a pipeline.

The branch misprediction resolution techniques discussed above can be useful for any branch which controls termination of loop which comprises a predicated loop body for which effects of the predicated loop body will be suppressed by predication if the loop body is executed unnecessarily following a mispredicted-non-termination branch misprediction for the predicated-loop-terminating branch instruction.

In one example, the predicated loop body comprises operations to:
  determine a variable number of bytes to be processed in a current iteration;
  perform at least one processing operation based on the variable number of bytes determined for the current iteration, the at least one processing operation including at least one of a load operation and a store operation; and
  update, based on the variable number of bytes, a remaining bytes parameter indicative of a remaining number of bytes to be processed.

The loop termination condition for a given iteration of the predicated-loop-terminating branch instruction can be considered satisfied when the remaining bytes parameter indicates that the number of remaining bytes to be processed is zero.

A loop comprising this type of predicated loop body can be useful for allowing a specified total number of bytes to be processed iteratively when the total number of bytes required to be processed may be greater than the maximum number of bytes that can be processed by the processing circuitry in one iteration. This type of predicated loop body is particularly suitable for the branch prediction resolution techniques discussed above, because, in the condition when the loop termination condition should be satisfied, the variable number of bytes may be zero and so processing a further iteration of the predicated loop body unnecessarily may in any case have the at least one processing operations suppressed by predication based on the fact that the variable number of bytes determined for that further iteration will be zero. Hence, this gives opportunities to reduce the delay associated with handling mispredicted-non-termination branch mispredictions by suppressing flushing to allow at least one unnecessary iteration of the predicated loop body to remain in the pipeline.

This technique can be particularly useful in cases where the variable number of bytes is dependent on alignment of a target address of said at least one of the load operation and the store operation with respect to an alignment boundary. The alignment boundary may correspond to an integer multiple of a certain power of 2 number of bytes. It may be desirable to consider address alignment when choosing the variable number of bytes, because in typical memory systems, accesses to addresses aligned to an alignment boundary can be more efficient to process than accesses to an unaligned address. For example, some memory system components, such as caches, interconnects or memory controllers, could split accesses requiring a target block of data which crosses an alignment boundary to be split into separate memory transactions. For a loop involving a number of passes through a loop body that includes a load and/or store operation, if the address for the load/store operation is unaligned on every iteration of the predicated loop body, this may greatly increase the total number of transactions required to be handled by the memory system. Hence, when the address for a first iteration of the predicated loop body is unaligned, it may be preferable to determine the variable number of bytes to be less than the maximum number of bytes that could be processed in the first iteration, so that an address for the load or store operation in the next iteration can become an aligned address and this will allow subsequent iterations to require fewer memory transactions. When the variable number of bytes depends on address alignment, this can make the prediction of whether the loop termination condition is satisfied extremely hard to predict for the branch prediction circuitry because this depends on the particular address operand specified for the first iteration of the predicated loop body. Hence, with a predicated loop body involving a load or store operation where the number of bytes to process in a particular loop iteration is variable and depends on an address alignment, the techniques discussed above can be particularly useful to improve performance by enabling branch mispredictions to be handled more efficiently.

The techniques discussed above can be particularly useful in predicated loops which implement certain string processing library functions defined in the string.h header file of the C programming language. String.h is a library which provides a certain group of functions for manipulating strings stored in memory, where a string is a sequence of text characters. These functions can include memcpy (a function to copy a string from one region of memory to another), memcmp (a function to compare two strings), strchr (a function to search for the first occurrence of a specified character within a given string loaded from memory), strlen (a function to determine the length of a specified string variable, e.g. by searching for the first byte equal to 0 after a particular address in memory), and so on. Such functions can seem apparently simple to the software developer, but can be relatively performance intensive when compiled into the machine code which will actually be executed by the processor. In the compiled code, these functions may be implemented by using a predicated loop body similar to the one discussed above. In some software applications, a relatively large fraction of processing time can be taken up by such string processing functions. As each instance of calling the string.h processing function may lead to multiple iterations of the predicated loop body being performed and each iteration of the predicated loop body may be associated with a predicated-loop-terminating branch instruction, such software applications may be extremely prone to loss of performance caused by branch mispredictions. The techniques discussed above can help reduce the branch penalty associated with addressing branch mispredictions for such predicated loops. Hence, it can be particularly useful for the predicated loop body to comprises operations to implement a string.h C library function.

One particular example of a string.h library function for which this technique can be particularly useful is the memcpy function, which copies a variable number of bytes of data from first memory region to a second memory region. Memcpy operations are very common in some software applications, and can be slow to process as they can involve iteration of load operations to load bytes of data from memory and dependent store operations to store the loaded bytes to a different region of memory. The loop executed for the memcpy operation can be a relatively tight loop for which the penalty caused by load/store delays and branch mispredictions can be high. By using the techniques discussed above, performance can be improved by reducing the delay penalty associated with branch mispredictions which may occur reasonably frequently for the predicated-loop-terminating branch that arises in such memcpy operations. Hence, it can be particularly useful to use the techniques described above when the predicated loop body comprises a memory copy operation to copy data from a first memory region to a second memory region.

In some examples, the predicated-loop-terminating branch instruction is a combined instruction for controlling the processing circuitry to perform both the predicated loop body and a conditional branch operation conditional on whether the loop termination condition is satisfied. For example, in response to the combined instruction, the instruction decoding circuitry may generate a set of micro-operations which controls the processing circuitry to perform both the operations associated with the predicated loop body and the conditional branch operation. This can help to reduce the code size in memory associated with the program that includes the predicated loop body. In an implementation which uses the combined instruction, the branch target address of the combined instruction serving as the predicated-loop-terminating branch instruction may be the address of the combined instruction itself, so that on each iteration when the loop termination condition is not satisfied, the instruction triggers a branch to itself so that a further instance of the same combined instruction will be fetched. The predicated loop body may include operations to increment or decrement tracking parameters which tracks the progress of the iterative function as a whole, e.g. updating addresses of load/store operations or an indication of the number of remaining bytes to be processed, so that gradually each iteration may reduce the number of remaining bytes to be processed and the loop as a whole may implement the required processing of a certain total number of bytes required to be processed. Hence, even when the combined instruction serving as the predicated-loop-terminating branch instruction branches to itself, the operands for that instruction may change from one iteration to the next. In an approach where the predicated-loop-terminating branch instruction is the combined instruction that also implements the functions of the predicated loop body, it can be relatively simple for the branch misprediction detection circuitry to distinguish the predicated-loop-terminating branch instruction from other types of branch, for example based on the instruction encoding of the combined instruction which may be specific to the processing of the predicated loop body. For example, when the branch misprediction detection circuitry detects that a branch misprediction has arisen for a memory copy instruction or other instruction associated with the implementation of a string.h C library function discussed above, then the approach to branch misprediction resolution described above can be used, while for other types of branch not triggered by one of those instruction encodings, a different approach could be taken.

In other examples, the predicated-loop-terminating branch instruction is separate from one or more instructions for controlling the processing circuitry to perform the predicated loop body. For example, the instructions associated with the predicated loop body may be followed by the predicated-loop-terminating branch instruction which may trigger a conditional branch to the start of the predicated loop body if the branch termination condition is not satisfied. In the case when the predicated-loop-terminating branch instruction is separate from the one or more instructions for controlling the performance of the predicated loop body, it is possible that the predicated-loop-terminating branch instruction could have the same encoding as a branch instruction which could also be used in other scenarios not associated with the termination of the predicated loop body as discussed above. For example, the predicated-loop-terminating branch instruction could be a generic conditional branch instruction which is not specific to the processing of the predicated loop body. In this case, the branch misprediction detection circuitry may have another mechanism, other than simply examining the encoding of the predicated-loop-terminating branch instruction, for detecting that a particular branch instruction is the predicated-loop-terminating branch instruction which is evaluating the loop termination condition for a predicated loop body as discussed above. For example, on encountering the instructions associated with the predicated loop body itself, some tracking state could be recorded to flag that a subsequent branch instruction may be treated as the predicated-loop-terminating branch instruction. Also, prediction state information related to a particular address could be gathered based on monitoring of program behaviour when it is detected that a particular loop has iterated through a set of instructions multiple times and there is predication within that loop, and that prediction state information could be used to determine whether a branch instruction at a particular address should be treated as the predicated-loop-terminating branch instruction. Hence, it will be appreciated that there are a wide variety of mechanisms by which the predicated-loop-terminating branch instruction could be detected so that the techniques discussed above for handling mispredictions can be implemented.

Example Processing Apparatus

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor a register renaming stage could be included, e.g. between the decode stage 10 and issue stage 12, for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU) 28 is provided to perform memory management operations such as address translation and checking of memory access permissions. The address translation mappings and access permissions may be defined in page table structures stored in the memory system. Information from the page table structures can be cached in a translation lookaside buffer (TLB) provided in the MMU 28. In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness. The decode stage 10 and execute stage 16 are examples of the instruction decoding circuitry and processing circuitry mentioned earlier.

As shown in FIG. 1, the apparatus 2 includes a branch predictor 40 for predicting outcomes of branch instructions. The branch predictor is looked up based on addresses of instructions to be fetched by the fetch stage 6 and provides a prediction of whether those instructions are predicted to include branch instructions, and for any predicted branch instructions, a prediction of their branch properties such as a branch type, branch target address and branch direction (the branch direction indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios. Branch misprediction detection circuitry 46 detects, based on outcomes of branch instructions executed by the branch unit 24, whether a branch has been mispredicted, and controls the pipeline 4 to suppress effects of the mispredicted branch instruction and cause execution of instructions to resume based on the correct branch outcome (e.g. by flushing operations that are younger than the branch in program order and resuming fetching from the instruction that should be executed after the branch). The prediction state data in the BTB 42 and branch direction predictor 44 is trained based on the outcomes of executed branch instructions detected by branch misprediction detection circuitry 46.

As explained further below, further prediction structures that can be provided in the branch predictor for predicting outcomes of predicated-loop-terminating branch instructions, such as a predicated loop prediction structure 48 that can store prediction state, trained based on past instances of executing the entire loop, for predicting the outcome of predicated-loop-terminating branch instructions within a predicated loop; and a side structure 49 which can store an expected run length for a currently executing predicated loop, evaluated based on operands of the first iteration encountered for the currently executing predicated loop.

The apparatus also has exception handling circuitry 50 to detect causes of exceptions, such as faults caused by memory accesses, attempts to execute undefined instructions, security violation faults, external interrupts, etc. When an exception arises, processing is interrupted and the exception handling circuitry 50 causes the processing pipeline 4 to switch to executing instructions from an exception handler associated with the particular type of exception that occurred. When the exception handler completes, processing can return to the processing that was being performed before the exception occurred.

Also, the apparatus has performance monitoring circuitry 52 for performing performance monitoring to gather performance monitoring information which can be analysed by a software developer to understand the performance achieved when processing a given program, so that they can take that into account for developing the program to try to improve performance. For example, the performance monitoring circuitry 52 may include a number of performance counters which may count occurrences of certain events such as instructions being executed, accesses to a cache, cache misses, address translation misses in the translation lookaside buffers of the MMU 28, and so on. Each time a certain event occurs during processing of the program code, the corresponding performance counter can be incremented, and after a period of monitoring, values of the performance counters can be read to provide the diagnostic information useful for software development.

Predicated Loop Example (Memory Copy)

FIG. 2 illustrates processing of a memory copy instruction for copying data from a first memory region to a second memory region. The memory copy instruction is a particular example of a predicated-loop-body instruction as mentioned earlier. In this example, the memory copy instruction also serves as the predicated-loop-terminating branch instruction mentioned earlier.

The memory copy instruction specifies a source address src identifying a first region of memory and a destination address dst identifying a second region of memory, as well as specifying a size parameter which identifies the number of bytes of data to be copied from the first region of memory to the second region of memory. Any addressing mode may be used to identify the address operands (e.g. using an absolute address, or as a relative address specified using an operand defining an offset, which could be specified relative to a base address stored in a register 14 or relative to an instruction address of the memcpy instruction itself). The left-hand portion of FIG. 2 shows a sequence of program instructions as they would be stored in memory prior to being fetched by the fetch stage 6. A single instance of the memory copy instruction is included surrounded by a certain number of other instructions A, B, C, D.

Although the size parameter of the memory copy instruction may specify a certain total number of bytes to be copied, that size may be greater than the maximum number of bytes that can be copied in a single instance of executing the memory copy instruction, and so the memory copy instruction may be interpreted as an implicit branch instruction which, if the number of bytes copied in response to a particular instance of the memory copy instruction is such that there are still some bytes remaining of the total number of bytes to be copied, then the memory copy instruction triggers a branch to itself, so that a further instance of the memory copy instruction is executed to represent a further iteration of a predicated loop (the size parameter can be decremented by the number of bytes processed on each iteration of the memory copy instruction to track how many bytes remain to be processed, and the source/destination addresses of the memory copy instruction can be incremented by the number of bytes processed so that each iteration of the memory copy instruction moves onto the next chunk of data in memory after the chunk processed in the previous iteration).

The branch predictor 40 can predict how many iterations of the memory copy instruction will be required before the loop terminates, so that it can control the fetch stage 6 to fetch the memory copy instruction the predicted number of times before moving onto the next instruction after the memory copy instruction. For example, the branch predictor 40 can use the predicated loop prediction structure 48 to detect whether the loop should be terminated at a given iteration of the loop. If the number of iterations of the memory copy instruction is mispredicted, the branch misprediction detection circuitry 46 may (sometimes) trigger a flush of incorrectly scheduled micro-operations which should no longer be executed, and control the pipeline 4 to resume fetching operations from after the mispredicted branch, including fetching more instances of the memory copy instructions if required.

Hence, the middle portion of FIG. 2 shows the fetched sequence of instructions fetched by the fetch stage 6 when the program instruction stored in memory are executed. Note that, in the fetched instruction sequence as shown in the middle portion of FIG. 2, all of the instances of the memory copy instruction shown are actually different fetched instances of the same instruction fetched from the same instruction address, where the branch predictor 40 has predicted that N iterations of the loop will be needed before the loop termination condition occurs (which in this case is when the size parameter indicates that the number of remaining bytes to be processed has reached zero).

The right-hand portion of FIG. 2 illustrates a decoded sequence of micro-operations generated by the decode stage 10 corresponding to the fetched instruction sequence shown in the middle part of FIG. 2. For a given instance of fetching the memory copy instruction for a particular iteration of the memory copy loop, that instance of the memory copy instruction is mapped by the decode stage 10 to a group of multiple micro-operations 60-72 which collectively implement a single iteration of the memory copy loop. Hence, in the example shown in FIG. 2 where N iterations of the memory copy loop are required, there will be N sets of the group of micro-operations 60-72 illustrated with the bracket (FIG. 2 only shows one iteration of these micro-operations for conciseness).

The micro-operations generated for a particular iteration of the memory copy loop include at least one micro-operation 60 to determine a variable number of bytes X based on the size parameter, the source address and/or the destination address (while FIG. 2 shows a single micro-operation 60, other implementations may need more than one micro-operation to assess the addresses and calculate the number of bytes). The number of bytes X may be selected so as to not exceed the number of bytes indicated by the size parameter, which may indicate a maximum number of bytes allowed to be copied in response to the current iteration of the memory copy loop. However, the micro-architecture of the processing circuitry 16 may have the flexibility to vary the number of bytes X selected, depending on micro-architectural implementation choice. In general, the particular value selected for X can vary from implementation to implementation (e.g. some implementations may support a greater maximum size for X than others) and between different iterations of the memory copy loop, even when all the operands (destination address, source address, size) are the same. This flexibility is possible because the update made to the size parameter and source/destination memory addresses in response to the current iteration of the predicated loop will account for the number of bytes that have actually been copied and then this will cause the operation of subsequent iterations of the memory copy loop to be adjusted accordingly so that the overall effect of the loop as a whole can be the same even if the particular number of bytes processed in a particular iteration varies.

For example, the variable number of bytes X could be determined based on the alignment of the source address and/or the destination address with respect to an address alignment boundary. The memory system 34 may be able to handle memory accesses more efficiently if a request is made specifying an address which is aligned to an address alignment boundary than when an unaligned access to a block of data which spans an address alignment boundary is requested. This is because some internal control mechanisms of the memory system, such as control logic and queues associated with a cache, interconnect or memory controller, may assume that requests specify an address aligned to an address boundary corresponding to an address block of a certain size such as a certain power of 2 number of bytes, and so if a block of data crossing such an address alignment boundary has to be accessed, then the load/store circuitry 26 may split the memory access into a number of separate requests each specifying a portion of data which does not cross the address alignment boundary.

For the memory copy loop, if the source/destination address is unaligned for the first iteration of the memory copy loop, and each iteration selects as the number of bytes X the maximum possible number of bytes that can be processed in one iteration, the source/destination address after the update performed in that iteration may still be unaligned, so the next iteration would then also make an unaligned access. Hence, if each iteration requires an unaligned access, this may increase the overall number of requests that need to be made to the memory system because on each iteration of the memory copy loop an access to an unaligned block may require multiple separate memory access requests to be issued to memory. In contrast, if most iterations of the memory copy instruction can perform an aligned access then this may only require one memory access request to be issued per iteration, which can reduce the total amount of memory bandwidth consumed by the accesses to memory and hence improve performance.

Therefore, it can be useful on the first iteration of the memory copy loop, if the source address or destination address is unaligned, to select the variable number of bytes X so that, even if the hardware would be capable of handling an access to a greater number of bytes in the current iteration, X is selected so that for a subsequent iteration of the memory copy loop at least one of the source address and the destination address becomes an aligned address aligned to an address alignment boundary. For example, X may be selected based on the difference between the source address and the address representing the next address alignment boundary after the source address, or based on the difference between the destination address and the address representing the next address alignment boundary after the destination address. In cases where the alignment of the source address relative to an address alignment boundary is different compared to the alignment of the destination address relative to an address alignment boundary, it may not be possible to align both the source and destination addresses to the alignment boundary for the next iteration of the memory copy loop, and so in that case some implementations may choose to prioritise the load alignment and other implementations may choose to prioritise the store alignment.

Also, the micro-operations generated for a particular memory copy instruction iteration include a predicated vector load micro-operation 62 which loads a destination vector register with at least X bytes of data obtained from memory system locations identified based on the source address src. FIG. 3 illustrates an example of the predicated vector load micro-operation 62. The destination register of the load micro-operation comprises a number of vector elements (e.g. 8 vector elements V[0] to V[7] in this particular example), and the source address src (assumed to be equal to #A in this example) identifies the data to be loaded to the first of the vector elements, V[0], with the subsequent vector elements being loaded with data associated with addresses which are generated by applying successive address increments to the address #A specified by the source address parameter. In this example, the increment between the addresses associated with two adjacent vector elements is 1 byte, but it would also be possible for predicates to be applied at a granularity larger than 1 byte. The predicate operand specifies which vector elements are active and which vector elements are inactive. For example, the predicate can be represented as a mask for which bit values equal to 1 indicate the positions of the active vector elements in the destination register and bit values equal to 0 indicate the positions of the inactive vector elements. In this example, the first five elements of the vector are active and the remaining three elements are inactive, indicating that vector elements V[5] to V[7] should have the corresponding load operations suppressed. Hence, if the micro-operation 60 had determined that the number of bytes X to load equals 5 then the predicate could be generated as shown in FIG. 3 to indicate that 5 bytes of data should be loaded to the first five elements of the vector.

As shown in FIG. 2, the set of micro-operations generated for a given memory copy instruction also includes a predicated vector store micro-operation 64 which stores the variable number X of bytes from a source register (which can be specified to match the destination register used by the load micro-operation 62) to memory system locations identified based on the destination address (again, the address corresponding to each vector element of the source vector register can be identified based on applying address increments to the destination address). Similar to the load micro-operation shown in FIG. 3, a predicate operand can be generated to predicate the store operations and ensure that the data from active elements of the store source register are saved to memory while store operations are suppressed for the inactive vector elements. The number of active elements indicated by the predicate operand may be determined based on the number of bytes X determined by micro-operation 60. The store micro-operation 64 may share the same predicate operand as the load micro-operation 62.

Hence, the combination of the load micro-operation 62 and the store micro-operation 64 can implement the required memory copy operation to copy X bytes of data from the source memory region to the destination memory region. The loop of decoded micro-operations then includes a number of micro-operations for maintaining the address and size parameters of the memory copy instruction to account for the number of bytes of data which have already been processed. Micro-operations 66, 68 increment the source address and the destination address respectively by X, the copied number of bytes, so that the source and destination addresses for a subsequent iteration of the memory copy loop will be advanced in memory by X bytes. Also, micro-operation 70 is generated which causes the size parameter of the memory copy instruction to be decremented by X, so that the number of bytes of data remaining to be copied can be indicated to be X bytes fewer than was the case for the current iteration.

The set of micro-operations for a given instance of the memory copy instruction also includes a branch micro-operation 72 which performs a conditional branch to the instruction address of the memory copy instruction itself, with the branch being taken if the size parameter after the update performed by micro-operation 70 is greater than 0 and the branch being not taken if the size parameter is 0. That is, this branch is conditional on whether the loop termination condition for the loop is satisfied. Although not shown in FIG. 2 for conciseness, in some instruction set architectures there may also be a need for an intervening compare instruction between micro-operation 70, 72 to compare the size parameter with 0 and set a condition status flag accordingly, which the branch micro-operation 72 can used to determine whether to take the branch.

Hence, each iteration of the memory copy loop may perform the memory copy operation for a certain number of bytes X which is limited, as a maximum, to the number of bytes indicated by the size parameter but is allowed to be smaller, and then the determined number of bytes are copied from a source region of memory to a destination region of memory and the addresses and size parameter are updated accordingly and if it is still necessary to perform a further iteration of the loop because there is at least one remaining byte to be copied then a branch to the memory copy instruction itself is triggered. In other examples, the operations indicated by micro-operations 60-72 could have been represented by separate program instructions in the representation of the program stored in memory, rather than being cracked by the instruction decoder 10 from a single memory copy instruction.

Memory copy (memcpy) functions are one example where such a predicated loop of operations can be useful. However, there are also other library functions in programming languages such as C for which a similar technique can be useful. For example, the string.h C library functions for string processing can be implemented using a similar iterative technique where a certain operation is performed on a variable number of bytes and a loop is iterated a number of times until the required number of bytes have been processed. In the memory copy example, the predicated vector load micro-operation 62 is followed by a predicated vector store micro-operation 64, but other string processing functions could have a different operation after the predicated vector load micro-operation 62.

For example, the memcmp( ) function, which is for comparing N bytes of two strings to determine whether they are the same, may provide a predicated vector compare micro-operation instead of the vector store micro-operation 64. The predicated vector compare operation may perform an element-by-element comparison of the vector loaded by the load micro-operation 62 with a second vector representing a string to be compared (e.g. each element of the two vectors may represent one character of the respective strings), and a comparison result may be set depending on the comparison outcomes of each pair of active elements within the two vectors (and depending on the comparison outcome of any preceding iteration of the loop). A predicate operand (generated based on the variable number of bytes determined at micro-operation 60) can be used to ensure that the comparison outcomes for any inactive elements do not contribute to the comparison results.

Another example of a string processing function which could use a similar approach is the strlen( ) function which detects the length of string stored at a particular region of memory, by loading the string from memory and searching for the position of the first byte of data having a value of 0 after the start of the string. This can be implemented using a loop as shown in FIG. 2 where the vector load 62 loads a portion of the string from memory and a subsequent vector comparison instruction performed instead of the store micro-operation 64 compares each of the loaded bytes of data against 0. Again, a predicate operand can be used to predicate the load operation so that the number of bytes X processed in a given iteration may be selected so as to cause the source address for the next iteration to be an aligned address to improve performance, and this predicate operand may then also predicate the subsequent compare micro-operation to ensure that the overall comparison results does not incorrectly depend on data within an inactive element of the vector.

Another example of a string processing function which could use a similar approach is the memset( ) function which sets each byte within a given destination region of memory to a certain predetermined value, where the number of bytes updated in the destination region of memory is determined based on a parameter of the instruction, and again an iterative approach can be used where each iteration determines a certain number of bytes X to be processed (e.g. based on the maximum size supported for the memory transaction, the number of remaining bytes, and address alignment), and then issues a predicated store predicated based on the determined number of bytes X, before updating the store address and the number of remaining bytes parameter based on the variable number of bytes X processed in that iteration, and then conditionally branching for another iteration of the loop body if there is still at least one further byte remaining to be processed. For memset( ) there would be no need for the predicated loop body to include the predicated load micro-operation 62 shown in FIG. 2.

It will be appreciated that these are only some examples of processing functions which could use the technique discussed below. Although FIG. 2 shows an example where the micro-operations for a given iteration of the predicated loop body are generated by the instruction decoder 10 in response to a single combined instruction, it would also be possible in other implementations for the operations of the predicated loop body to be defined a separate program instructions in the representation of the program code stored in memory. Also, while FIG. 2 shows an example where the instruction that controls the performance of all or part of the predicated loop body also triggers the conditional branch depending on whether the loop termination is satisfied, it would also be possible for the conditional branch on each iteration of the predicated loop body to be performed in response to a micro-operation generated in response to a separate branch instruction included in the program code stored in memory separate from the instruction implementing the predicated loop body of the memcpy or other string processing function.

Memory copy functions and other string processing functions are some of the most common library functions to be used by software applications. Applications using these functions can therefore see a significant performance improvement if processing of these functions can be accelerated. Including a dedicated program instruction in the instruction set architecture, such as the memcpy instruction shown in FIG. 2, can help to reduce the overhead of fetching instructions from the cache or memory, although this is not essential and as mentioned above it would also be possible to promote these functions using a number of separate program instructions. Nevertheless, the performance achieved for such instructions may depend on the way in which branch prediction is handled for these instructions, because the branch predictor 40 may need to predict how many iterations of the operations associated with the predicated loop body are to be fetched and issued for execution. This depends on prediction of the outcome of a predicated-loop-terminating branch instruction, such as the memcpy instruction shown in FIG. 2 or a separate conditional branch instruction following the instruction(s) of the predicated loop body of such a predicated loop, and that outcome may be relatively hard to predict because the point at which the loop terminates may be affected both by memory address alignment and copy data size (the total number of bytes required to be processed, as specified by the remaining bytes parameter provided for the first iteration of the loop).

Typically, the processing circuitry 16 can adjust the number of bytes X selected for copying in a given loop iteration based on load/store address alignment, because modern CPUs generally prefer to load/store data with a certain aligned address (e.g., 16-byte aligned, or aligned to some other boundary associated with a block size corresponding to a certain power-of-2 number of bytes). To force this alignment, the memcpy function in the predicated loop body can copy a small number of bytes instead of processing entire word in the first iteration, so that the address for the next iteration becomes aligned.

For example, in the case of memcpy(dst, src, 30), the number of iterations for the entire memcpy loop can vary based on the address alignment (assuming 16-byte alignment in this example):
 (a) Src=0x100
  Iter-1: Copy 16 bytes/after iter-1, src=0x110, remaining size=14
  Iter-2: Copy 14 bytes
 (b) Src=0x1fc
  Iter-1: Copy 4 bytes/after iter-1, src=0x200, remaining size=26
  Iter-2: Copy 16 bytes/after iter-2, src=0x210, remaining size=10
  Iter-3: Copy 10 bytes The application may see further divergence when input size is different (e.g. size=10 and size=100 will cause different control flow).

Therefore, the total number of iterations required can diverge significantly depending on the data-dependent inputs to the predicated loop function, which makes predicting the outcome hard for the branch prediction circuitry. As shown in FIG. 1 the branch predictor 40 may have a predicated loop prediction structure 48, which can be used to predict whether a given iteration of the loop terminating branch within the predicated loop will terminate the loop. A number of entries may be maintained, indexed based on an instruction address associated with an instruction corresponding to the loop, such as the memcpy instruction shown in FIG. 2. Each entry could track, for example, the predicted number of total iterations of the loop, or in other examples could correspond to a specific iteration of the loop and indicate whether the loop terminating branch on that iteration is predicated to be taken or not taken. While such a predicated loop prediction structure 48 can help to partially reduce the number of branch mispredictions for such predicated loops, there may still be a significant number of mispredictions because the number of required iterations may vary for some loops from one instance to another based on the size and address alignment of the operands, and so the behaviour learned from a previous instance of the loop may no longer be accurate. Some techniques for reducing the latency penalty associated with such branches are discussed below.

Suppression of Flushing Unnecessary Iterations of Predicated Loop Body

Figure 4:
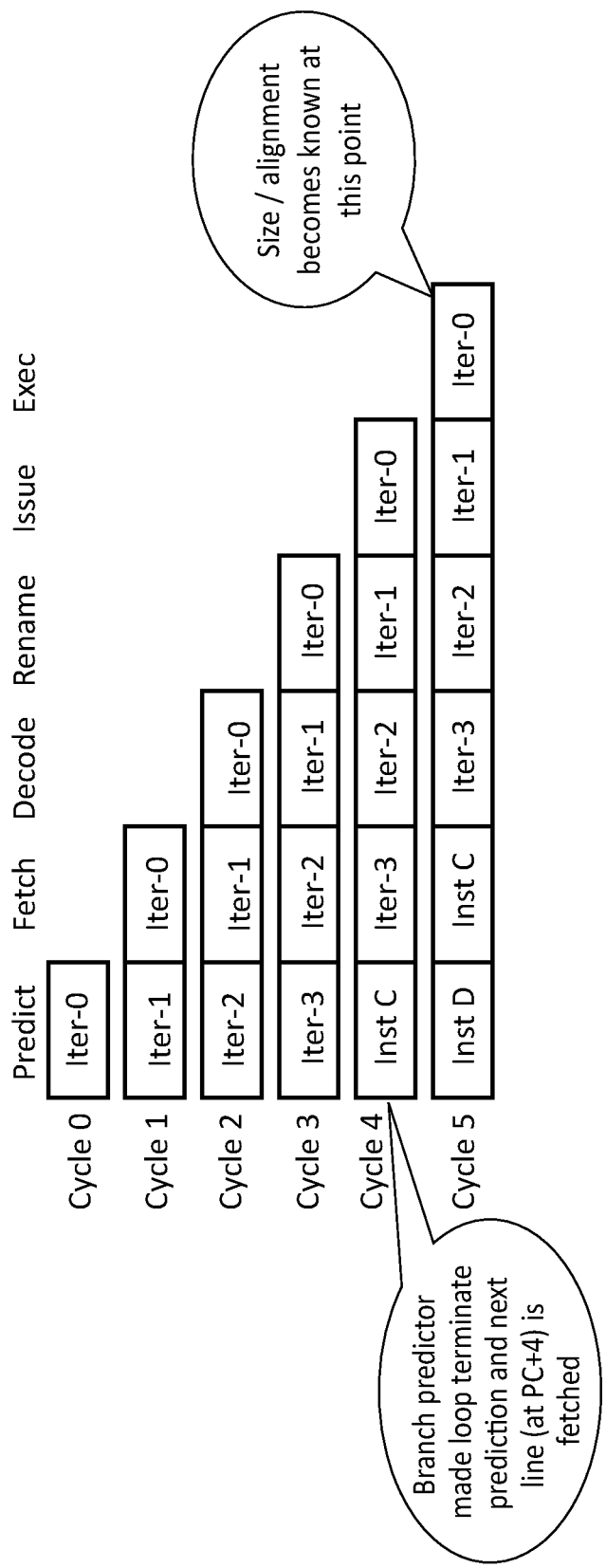
FIG. 4 is a pipeline diagram illustrating processing of a number of iterations of a predicated loop body.

FIG. 4 shows a general pipeline diagram illustrating processing of a number of iterations of the predicated loop body using a processing pipeline having a number of pipeline stages. In this example the pipeline stages include: a prediction stage corresponding to the operation of the branch predictor 40, the fetch stage 6, the decode stage 10, a register renaming stage (not illustrated in the example of FIG. 1) at which architectural register specifiers specified by the decoded instructions are mapped (renamed) to physical register specifiers identifying registers 14 provided in hardware (other examples may omit the register renaming stage); the issue stage 12; and the execute stage 16. Of course, this is just one example of a possible set of pipeline stages.

Instructions or micro-operations associated with each iteration of the loop progress from stage to stage of the pipeline so that while the instructions or micro-operations associated with an earlier iteration are at a later stage of the pipeline, the instructions or micro-operations associated with a later iteration can be processed at an earlier stage of the pipeline. In this example, for conciseness it has been assumed that the operations performed at a given stage for a given iteration of the predicated loop can be completed in one processing cycle (even if the processing operations corresponding to that iteration are mapped to multiple micro-operations by the decode stage 10). It will be appreciated that other implementations could take more than one cycle for some stages and so the particular timings shown in FIG. 4 are just one example.

In cycle 0, the branch predictor 40 receives, as an address for which a branch prediction should be made, an address of an instruction corresponding to iteration 0 of the loop, and predicts that the loop termination condition will not be satisfied so that a further iteration, iteration 1, will be required. Similarly, the branch predictor 40 continues to predict that the loop termination condition will not be satisfied for subsequent iterations, until when predicting the outcome of iteration 3 the determination condition is predicted to be satisfied, so that the prediction is that after iteration 3 is complete, the next instruction should be instruction C which follows the loop (as instruction C is the instruction following the memcpy instruction in the example of FIG. 2). Based on these predictions the branch predictor 40 controls the fetch stage 6 to fetch the required number of iterations of the instructions corresponding to the program loop body (e.g. a single memcpy instruction per iteration in the example of FIG. 2), and the subsequent stages then carry out their respective functions of decoding, renaming (if supported) and issuing, before the decoded micro-operations reached the execute stage for iteration 0 in cycle 5 in this particular example. At the point when the micro-operations corresponding to iteration 0 reach the execute stage 16, the operands for the micro-operations in iteration 0 are available, for example, the size parameter which determines the number of remaining bytes to be processed and the address for which the load/store is to be performed become known. These parameters can be used to determine whether the conditional branch for iteration 0 should have been triggered, and so at this point the branch misprediction detection circuitry 46 can determine whether the branch prediction for iteration 0 was correct.

Figure 5:
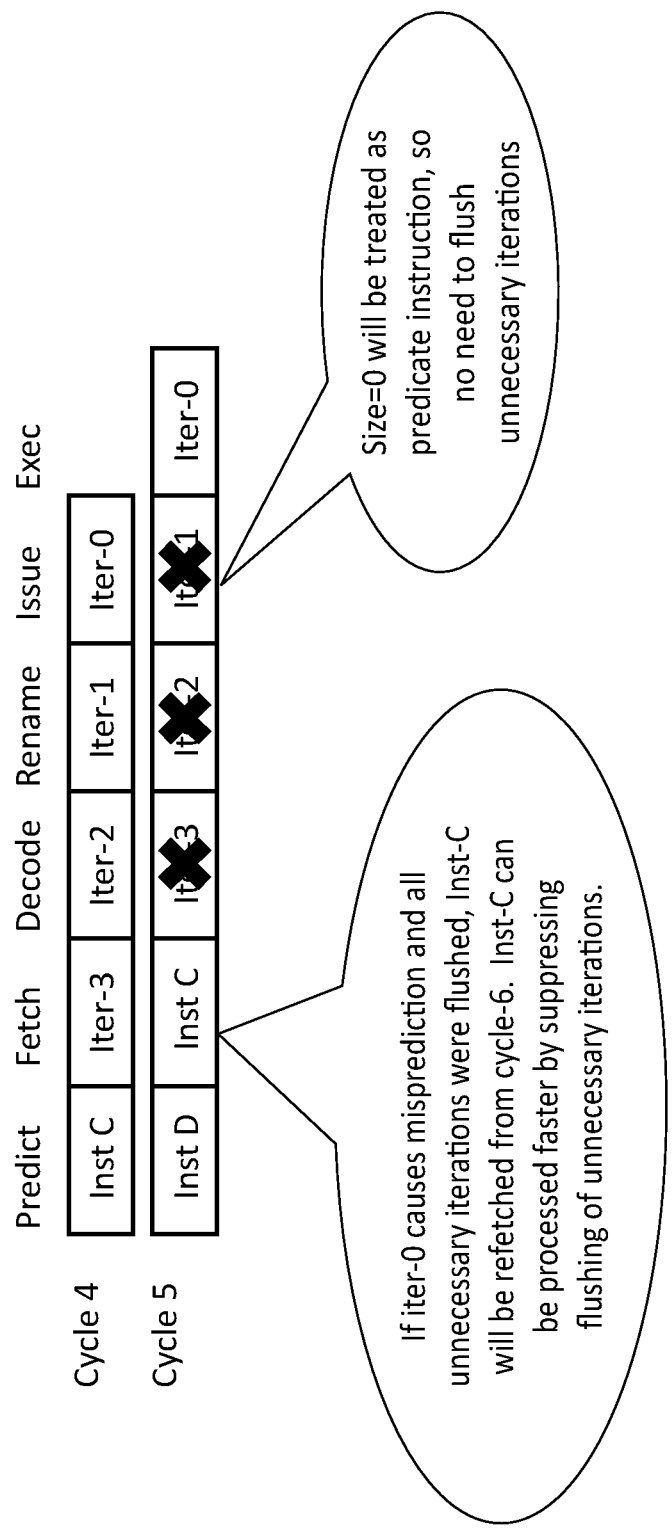
FIG. 5 is a pipeline diagram illustrating suppression of flushing of unnecessary iterations of the predicated loop body.

Normally, if it is now determined that a branch prediction was incorrect, the response taken by the branch misprediction detection circuitry 46 would be to flush the pipeline of any operations which are younger than the micro-operation for which the misprediction occurs, and so if iteration 0 is mispredicted as shown in the example of FIG. 5, one would normally expect to flush the micro-operations associated with iterations 1, 2, 3 which were unnecessary iterations which should not have been fetched. Normally, after triggering such a flush, fetching of instructions may then resume from the correct instruction which should have executed after the mispredicted branch.

However, in the example of FIG. 5, if a flush was triggered in response to the misprediction arising for iteration 0, this would flush the pipeline of all the remaining younger micro-operations after iteration 0, and re-fetching of the instructions to be processed after the branch would then commence in cycle 6 after the cycle 5 in which the branch misprediction was identified. In the example shown in FIG. 5, the correct number of loop iterations to be executed for the predicated loop should have been 1, so that the following instruction C should have been executed directly after the operations associated with iteration 0 of the predicated loop.

As shown in FIGS. 4 and 5, at the point when the branch misprediction is identified in cycle 5 when the micro-operations for iteration 0 reach the execute stage, the following instruction C may already have been fetched and be resident within the pipeline. Therefore, the following instruction C to be processed based on the correct branch prediction outcome can be processed faster by not flushing micro-operations after the mispredicted branch for iteration 0, but instead allowing the unnecessary loop iterations 1, 2, 3 to remain in the pipeline without being flushed. This is possible because the nature of the predicated loop body is such that if it is executed unnecessarily following a mispredicted-non-termination branch misprediction when the loop termination condition was predicted to be not satisfied when it should have been satisfied, then in any case the predication used for the operations within the predicated loop body means that the architectural effects of the unnecessarily executed operations will be suppressed. Using the example shown in FIG. 2, for instance, if an unnecessary loop iteration is carried out then the size parameter supplied for that iteration will be 0 (since if the correct outcome of the loop termination condition evaluation in the preceding iteration was that the loop should have terminated, this implies that the size was equal to 0 at the end of that iteration). If the size parameter is 0, then the load/store operations will be predicated to suppress the effects of the load/store (e.g. the destination register of the load will not be updated with data loaded from memory, and issuing of store requests to memory may be suppressed for the store operation when the predicate indicates that all the elements of the vector are inactive because the required number of bytes to be stored is 0). Similarly, incrementing the address parameters by X and decrementing the size by X will have no architectural effect if X=0. Therefore, it is possible to allow the micro-operations corresponding to unnecessary loop iterations fetched following a branch misprediction to remain without being flushed. By suppressing the flushing of the unnecessary iterations, the next instruction can be processed faster.

Early Pipeline Flush when Loop Predicted to Terminate Too Early

FIG. 5 shows an example where the branch predictor over-predicted the required number of loop iterations, leading to some unnecessary loop iterations being fetched for processing.

Figure 6:
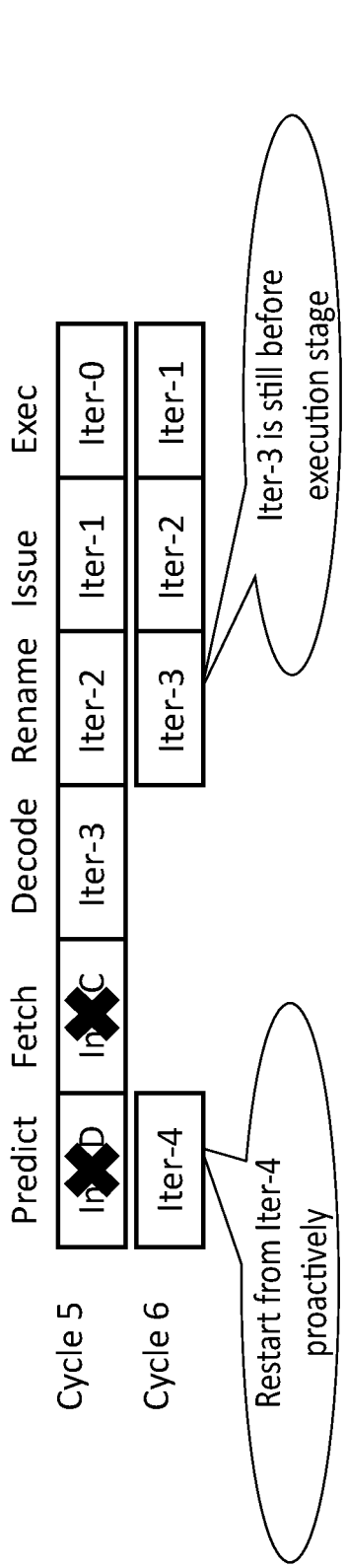
FIG. 6 is a pipeline diagram illustrating early flushing of iterations of the predicated loop body.

However, as shown in FIG. 6 it is also possible for a branch misprediction to cause insufficient loop iterations to be fetched for processing. For example, in FIG. 6 the branch predictions were correct for iterations 0, 1 and 2, but when making the prediction of whether the loop termination was satisfied for iteration 3, the branch predictor 40 predicted that the loop termination condition would be satisfied when it actually should not have been satisfied, so the fetch stage 6 fetched the next instructions C, D when a further loop iteration Iter-4 should have been fetched. Hence, the following instructions C, D fetched into the pipeline based on the loop termination prediction predicted for iteration 3 should be flushed and fetching should resume from iteration 4 so that at least one further iteration of the predicated loop body will be processed.

Normally, one would expect that branch mispredictions would be resolved when the mispredicted instruction or micro-operation reaches the execute stage 16 at which the operands of that instruction or micro-operation become available. Therefore, in a typical approach in the scenario shown in FIG. 6, one would expect that the branch misprediction for iteration 3 would be resolved when iteration 3 reaches the execute stage 16. However, for predicated loops of the type shown in FIG. 2, it is recognised that the total number of required loop iterations can be deduced from the operands provided for the very first iteration of the loop (in this case, iteration 0). For example, the total number of iterations can be deduced from the size parameter and load/store address provided for the first iteration of the loop and an indication of the maximum number of bytes that can be processed in a single iteration. Some circuit logic may be provided to analyse the address alignment and the size parameter and use this to calculate how many loop iterations will be required in total. For example, for the examples (a) and (b) provided above, this circuit logic may determine that the required number of iterations is 2 and 3 respectively. Hence, at the time that the first iteration 0 reaches the execute stage, the branch misprediction detection circuitry 46 can already detect whether any of the subsequent iterations have been mispredicted by the branch predictor 40, even though the micro-operations for those subsequent iterations have not yet reached the execute stage 16. If the mispredicted iteration is iteration 3, say, there is no need to wait for the corresponding micro-operations associated with iteration 3 to reach the execute stage before triggering the flush of the incorrectly fetched instructions C, D, and instead a flush can be initiated early, where rather than flushing all operations younger than the micro-operation currently at the execute stage 16, the flush can flush from the pipeline the operations which are younger than the micro-operations corresponding to the mispredicted iteration 3, which in the example of FIG. 6 is currently at the rename stage.

This early flushing of operations is possible because the nature of the predicated loop is such that the total number of micro-operations generated by the instruction decoding stage 10 per loop iteration remains fixed for every loop iteration, so that based on the loop iteration currently at the execute stage and the number of further iterations expected before the iteration which was mispredicted, the branch misprediction detection circuitry 46 can identify an instruction identifier or other indication associated with the point of program flow beyond which instructions or micro-operations should be flushed from the pipeline, even if the branch misprediction detection circuitry 46 does not currently have those instructions or micro-operations available at the execute stage. For example, if the fixed number of micro-operations performed per loop iteration is M and the micro-operation identifier associated with the iteration 0 at the execute stage when the branch misprediction for a subsequent iteration is identified is uid, and it is assumed that the instruction decoder will sequentially allocate micro-operation identifiers in an order corresponding to the program order as it generates micro-operations, then the micro-operation identifier representing the point beyond which micro-operations should be flushed from the pipeline may be uid+N*M, where N is the number of additional iterations of the loop that were fetched after iteration 0 before the iteration which encountered the misprediction is reached (e.g. for the example in FIG. 6, N=3). Hence, with this approach, when a mispredicted-termination branch misprediction occurs, the corresponding flush of the pipeline can be initiated early even though the iteration that encountered that misprediction has not yet reached the execute stage. Again, this can improve performance because the iteration 4 which should have executed after iteration 3 can be re-fetched earlier than would be the case if the flush was initiated when iteration 3 reached the execute stage.

Use of Run Length Computed at First Loop Iteration to Predict Outcome of Subsequent Iterations Another problem with performing branch prediction for predicated loops of the type discussed above may be back-to-back branch mispredictions where the branch outcome is mispredicted for several successive iterations within the same predicated loop. As shown in FIG. 1, the branch predictor 40 may have a predicated loop prediction structure 48 which may store prediction state information for predicting the loop termination condition outcome for a given iteration of the predicated loop body, based on information learnt from previous attempts to perform the same loop. For example, the predicated loop prediction structure 48 may have a set of entries which each associate:

a program counter (PC) address of an instruction identified to be a predicated-loop-terminating branch instruction;

an iteration count indication indicating a particular iteration of the loop for which that entry indicates a prediction; and a termination prediction indication, indicating whether the loop termination condition is predicted to be satisfied for the particular iteration indicated by the iteration count indication.

Hence, the predicated loop prediction structure 48 may have multiple entries associated with the same PC address, for different values of the iteration count. The branch predictor 40 may track, for an instruction identified as being a predicated-loop-terminating branch instruction, a count of how many iterations of the instruction have already been encountered. When performing a branch prediction for a given instance of the predicated-loop-terminating branch instruction, the branch predictor 40 can look up the PC address of the instruction and the current count value indicating how many iterations have been seen so far in the predicated loop prediction structure 48, and when the lookup hits against a valid entry, use the termination prediction indication to determine whether the branch should be taken or not taken.

However, a problem is that when training the predicated loop prediction structure 48, the number of iterations executed within the loop may vary from one training run to another. For example, consider the case when the branch predictor learns the run length by training based on the following sequence of attempts to execute a loop associated with a particular PC address:
  Training 1: total run length=4
  Training 2: total run length=3
  Training 3: total run length=2
  Training 4: total run length=1.

In this case, the loop termination point learnt for iteration 4 based on training run 1 will not be overwritten based on the subsequent training runs because those subsequent training runs had fewer iterations and so never learn any information for iteration 4. Similarly, training runs 2, 3 and 4 will learn that the loop should terminate after iterations 3, 2, 1 respectively. Therefore, as a result of these training runs, the structure 48 may have entries which predict that, for the PC associated with this loop, each value of the iteration count (1, 2, 3, 4) is associated with a loop termination prediction predicting that the loop should be terminated after that iteration.

Hence, if the processing pipeline 4 now executes the same predicated loop with different operands which require a total run length of 5 iterations, the branch predictor 40 is likely to make multiple mispredictions because every iteration within that loop is predicted to be a loop termination point:
  Iteration 1: predict run length=1 based on training 4 behavior, misprediction recovery required.
  Iteration 2 (after mispredict for iter 1): predict run length=2 based on training 3 behavior, misprediction recovery required.
  Iteration 3 (after mispredict for iter 2): predict run length=3 based on training 2 behavior, misprediction recovery required.
  Iteration 4 (after mispredict for iter 3): predict run length=4 based on training 2 behavior, misprediction recovery required.
  Iteration 5: branch mispredict since run length=5 has never been trained, misprediction recovery required.

Hence, the pipeline 4 observes 5 back-to-back mispredictions which will greatly harm performance.

Figure 7:
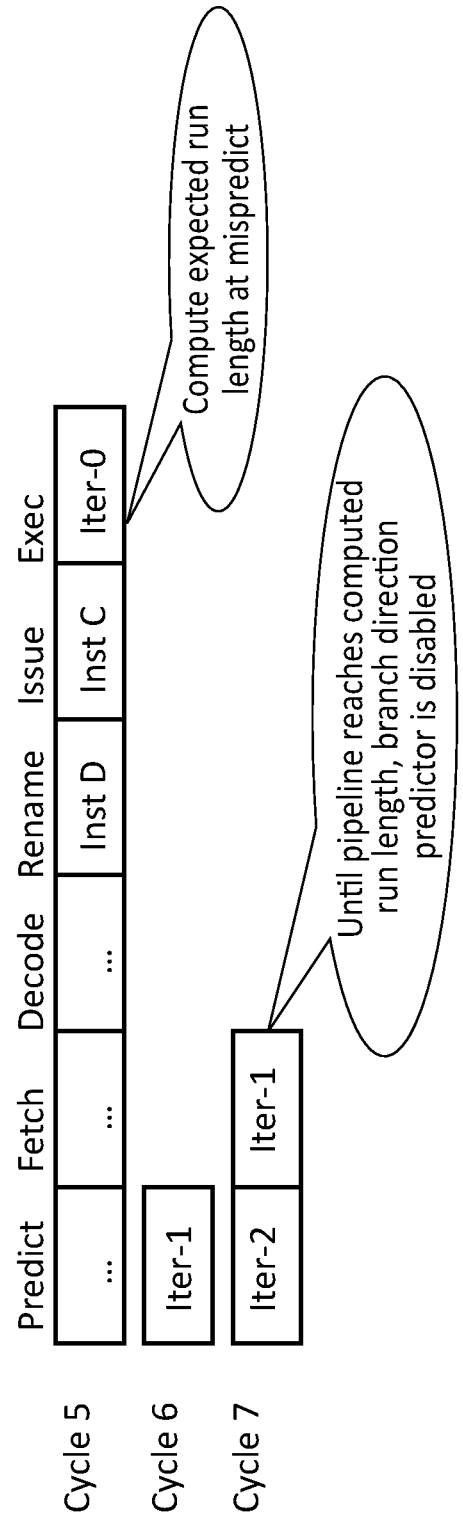
FIG. 7 illustrates disabling the branch prediction circuitry from making branch predictions based on branch direction prediction state obtained prior to encountering a first iteration of the predicated loop body, following a mispredicted iteration of the predicated loop body.

FIG. 7 shows a technique for mitigating against this problem. In response to the first iteration of the predicated loop body, the execute stage 16 can determine, based on the operands of the first iteration, the total run length (number of iterations) expected for the loop. This is possible because the number of bytes of data processed per loop iteration is deterministic once the operands (such as the load/store address and the required number of bytes to be processed) are known. The expected run length can be stored by the branch predictor 40 in a side structure 49 (e.g. a register, cache structure, or an existing structure of the branch predictor 40 which can have entries reused for other types of branch prediction information), separate from the predicated loop prediction structure 48 trained from previous encounters of the same loop. Unlike the predicated loop prediction structure 48, the side structure 49 is storing information detected from the current attempt at executing the loop, rather than the previous attempt at executing the loop.

For the remaining iterations of the loop, the use of the trained prediction state stored in the predicated loop prediction structure 48 for making branch predictions can be disabled, since the outcome of the branch in subsequent iterations can be predicted more accurately from the expected run length computed based on the operands of the first iteration of the current attempt at executing the loop. By disabling the branch predictor 40 from making branch predictions based on state learnt before the first iteration of the current loop was encountered, this prevents the back-to-back branch mispredictions discussed above. The branch predictor 40 continues to track the count of the number of iterations of the predicated-loop-terminating branch instruction seen so far within the currently executing loop, and predicts that the loop termination condition will not be satisfied for each iteration until the iteration count reaches the expected run length stored in the side structure 49. For the iteration when the iteration count matches the expected run length indicated in the side structure 49, that iteration is predicted to satisfy the loop termination condition. Once the loop has been predicted to terminate, the branch predictor 40 re-enables dynamic prediction based on prediction state stored prior to encountering the first iteration of the predicated loop (for example, the entry of the side structure 49 storing the expected run length can be invalidated so that subsequent lookups will not hit against this entry, causing prediction to fall back on using other structures like the predicated loop prediction structure 48 or the branch direction predictor 40 to predict the branch direction). Hence, this approach can improve performance by reducing the likelihood of encountering back-to-back branch mispredictions.

Branch Predictor Training for Long Loops

Figure 8:
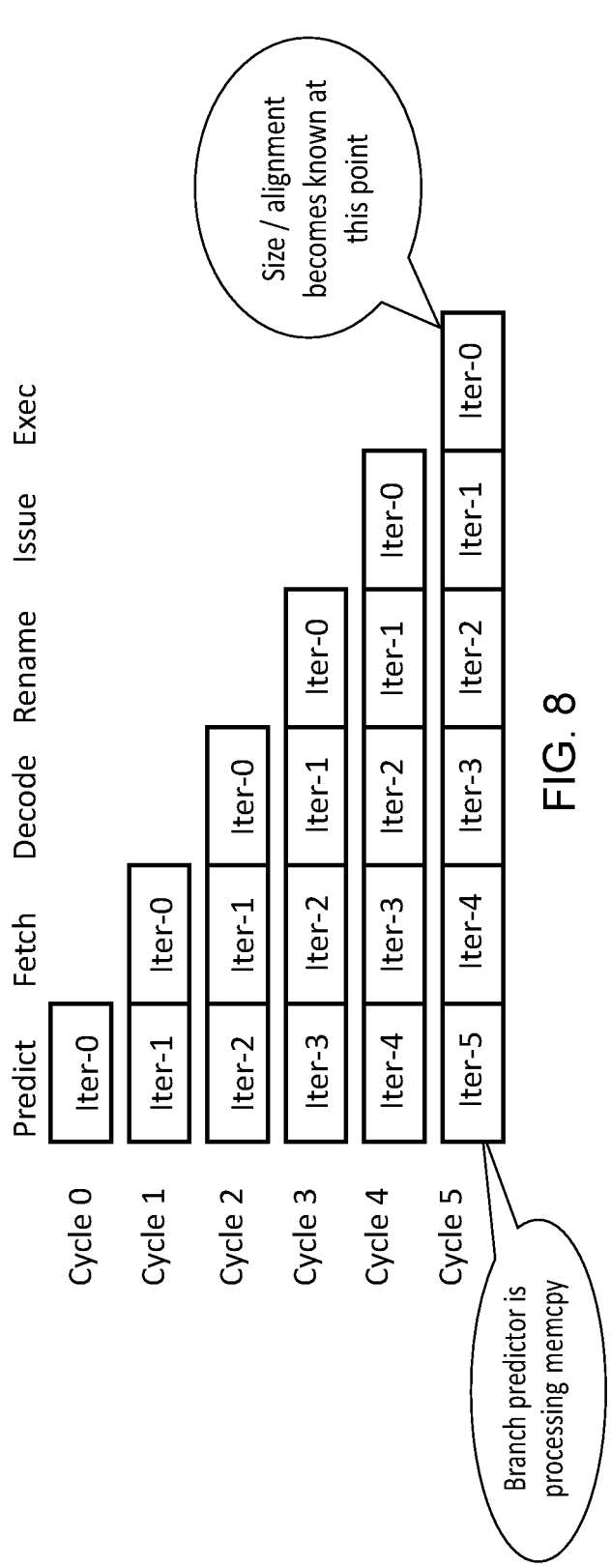
FIG. 8 illustrates a long loop example where, at the time of determining the outcome of a first iteration of the predicated loop body, the branch prediction circuitry has not yet predicted termination of the loop.

FIG. 8 illustrates an example when the number of iterations required for the predicated-loop-terminating branch instruction is relatively large so that when the first iteration reaches the execute stage 16, the branch predictor 40 has not yet made a loop termination prediction for a subsequent iteration of the loop. Hence, at the point when the number of bytes (size) to be processed and the alignment of the addresses becomes known, the branch predictor 40 is still processing instances of the predicated-loop-terminating branch instruction.

Figure 9:
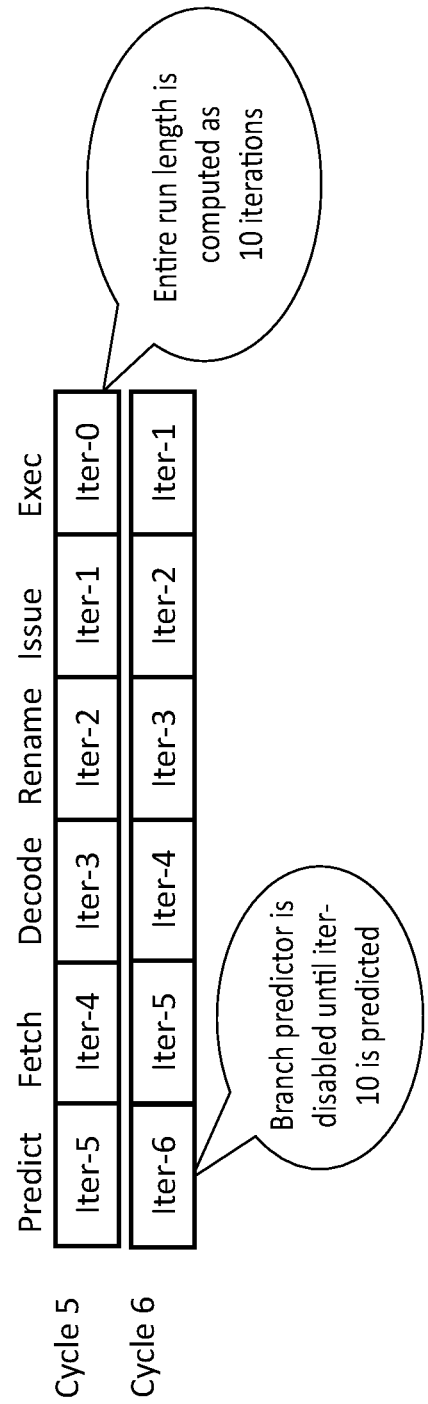
FIG. 9 illustrates an example of controlling fetching of subsequent iterations of the predicated loop body using a run length computed in response to execution of an initial iteration of the predicated loop body.

As shown in FIG. 9, the computation of the expected run length for the loop at the first loop iteration can also be useful in this scenario with a relatively long loop. Again, the expected run length is computed when the first iteration of the loop reaches the execute stage 16, and the expected run length is stored in a side structure 49 within the branch predictor 40 as discussed above FIG. 7. As in FIG. 7, branch direction predictions made by the branch predictor 40 using prediction state 48, 44 trained based on previous instances of encountering instructions prior to the first iteration of the current instance of the loop are disabled at this point, and for the remaining iterations of the current loop the expected run length is used to determine whether each iteration should terminate the loop or continue for another iteration. Hence, the subsequent iterations will be predicted as not satisfying the termination condition, until the iteration count reaches the expected run length for a given iteration at which point the given iteration is predicted as satisfying the termination condition. Predictions based on previously stored prediction state can be re-enabled once the loop has been predicted to terminate. Again, this approach improves performance by reducing the likelihood of branch misprediction, because the branch outcome for each iteration can be predicted more accurately based on the expected run length determined at the first loop iteration based on the actual operands for the current instance of executing the loop, than is possible using the predicated loop prediction structure 48 which is trained based on previous attempts at executing the same loop which may have had different operands and therefore a different number of iterations, or the branch direction predictor 44 which is trained based on previous instructions in a manner not specific to predicated-loop-terminating branch instructions.

It will be appreciated that it is not essential to provide the predicated loop prediction structure 48, and some approaches may choose to omit this structure and instead rely solely on run length computed at the first loop iteration for predicting outcomes of remaining iterations. However, in practice providing the predicated loop prediction structure 48 can be beneficial for performance as there can be some instances of the loop with relatively few iterations where the number of iterations tends to remain relatively constant, for which the predicated loop prediction structure 48 can allow the behaviour of those loops to be predicted earlier, before the micro-operations for the first iteration of the loop reach the execute stage 16.

Example Methods

Figure 10:
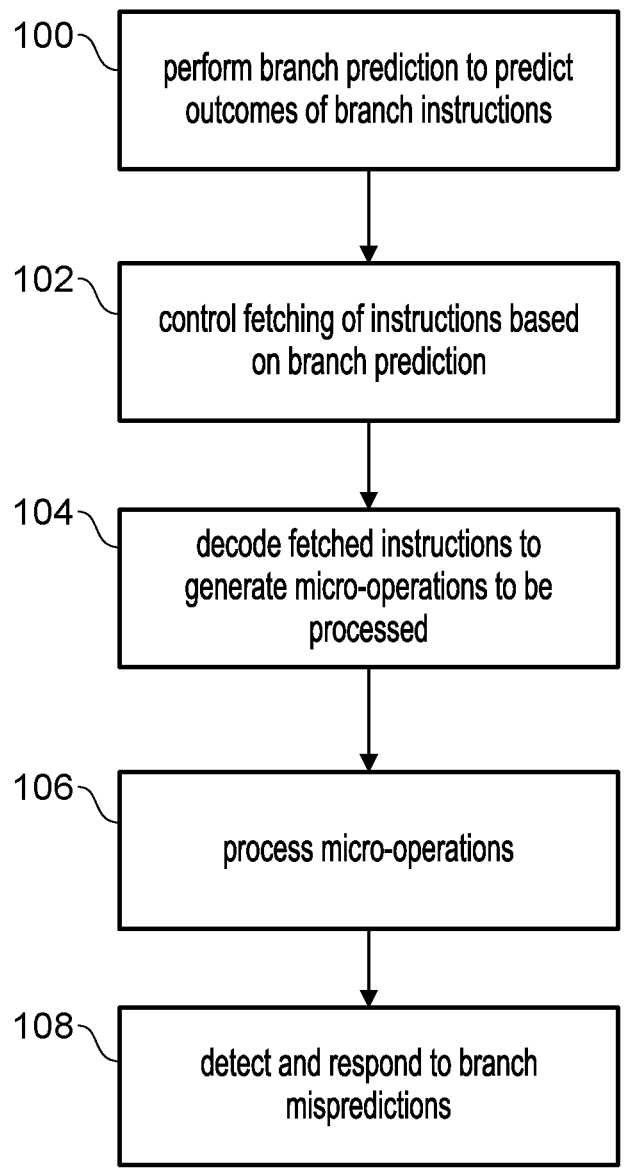
FIG. 10 is a flow diagram illustrating processing of micro-operations in response to decoded instructions fetched based on predictions made by branch prediction circuitry.

FIG. 10 is a flow diagram showing an example of a method of processing instructions. At step 100, the branch predictor 40 performs branch prediction to predict outcomes of branch instructions. At step 102, the fetch stage 6 controls fetching of instructions from the instruction cache 8 or memory 34 based on the branch predictions made by the branch predictor 40. At step 104, the decode stage 10 decodes the fetched instructions to generate micro-operations to be processed. The mapping of instructions to micro-operations could be a one-to-one mapping, a one-to-many mapping (some instructions can be split into separate micro-operations, such as the memcpy instruction shown in the example of FIG. 2), a many-to-one mapping (if instruction fusion is supported to allow multiple program instructions defined in the instruction set architecture to be merged into a single micro-operation supported by the hardware of the execute stage 16) or a many-to-many mapping. The mapping used may vary from one instruction type to another.

The decoded micro-operations are issued for execution by the issue stage 12 when their operands are determined to meet an availability condition. At step 106, the execute stage 16 processes the micro-operations to perform corresponding data processing operations. At step 108 the branch misprediction detection circuitry 46 detects whether any branch mispredictions have occurred, and if so, responds to the branch mispredictions. For example, sometimes when a branch misprediction occurs the pipeline may be flushed of instructions beyond the mispredicted point of program flow and processing may resume from the instruction which should have followed the branch based on the correct branch outcome. However, on other occasions the pipeline flush may be suppressed despite the branch misprediction, as discussed above for the case when unnecessary iterations of the predicated loop can be allowed to proceed regardless of the mispredicted-non-termination branch misprediction.

Figure 11:
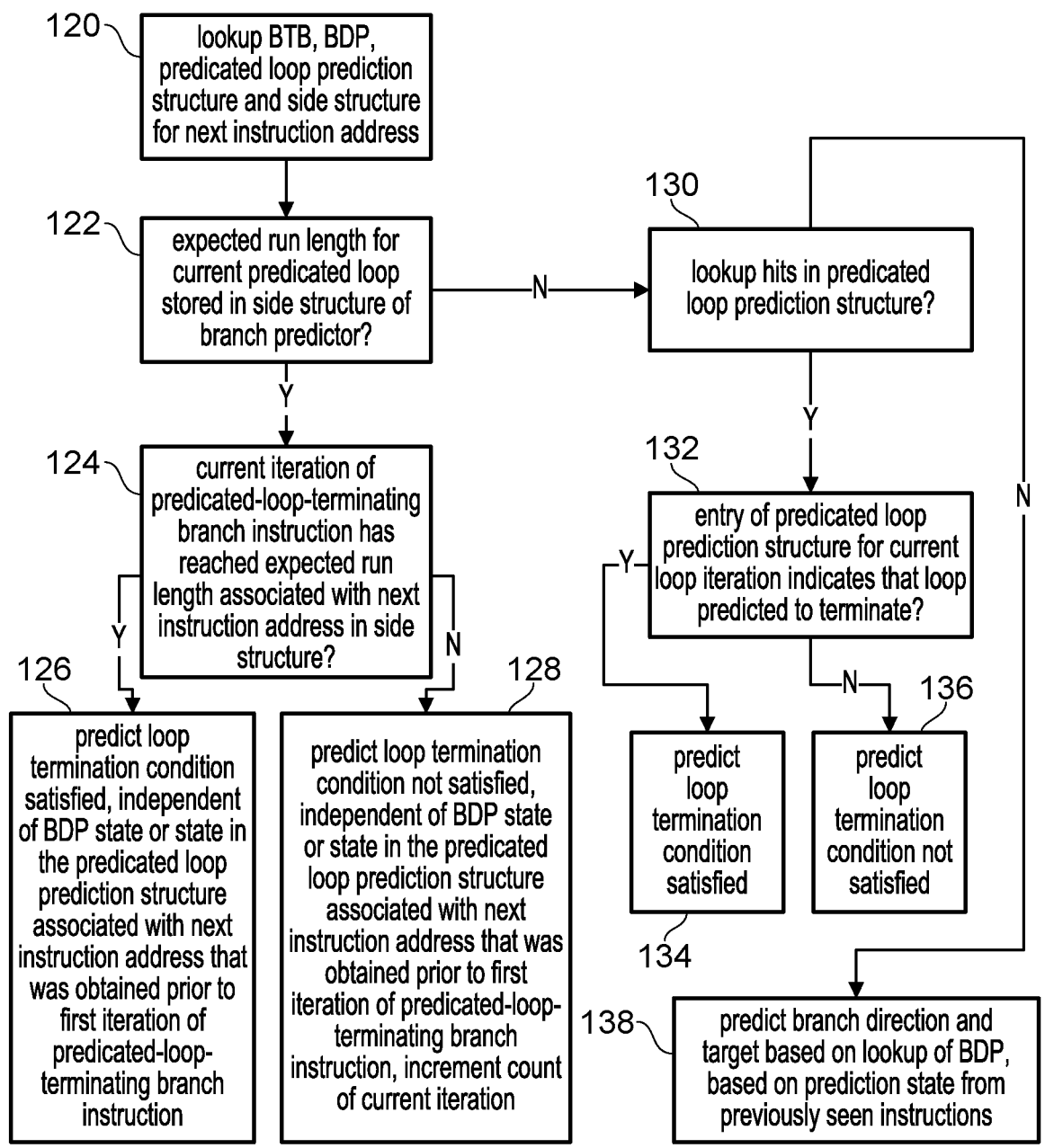
FIG. 11 is a flow diagram illustrating branch prediction.

FIG. 11 is a flow diagram illustrating a method of performing branch predictions using the branch predictor 40. At step 120 of FIG. 11, the branch predictor 40 looks up, based on the next instruction address for which a branch prediction is to be made, the branch target buffer 42, branch direction predictor 44, the predicated loop prediction structure 48, and the side structure 49 which stores the expected run length for a predicated loop if already computed based on the first iteration of that loop.

At step 122, the branch predictor 40 determines whether the lookup hits in the side structure 49. If so, then at step 124, the branch predictor 40 determines whether the current iteration of the predicated-loop-terminating branch instruction has reached the expected run length associated with the next instruction address within the side structure 49. This is the expected run length computed at the first iteration of the current instance of the predicated loop. If the current iteration matches the expected run length then at step 126 the branch predictor 40 predicts that the loop termination condition is satisfied for the instruction at the next instruction address. For example, for a predicated-loop-terminating branch instruction at the end of the predicated loop body, a not-taken prediction can be output. This prediction is made independent of prediction state stored in the branch direction predictor 44 or the predicated loop prediction structure 48 which was obtained prior to encountering the first iteration of the predicated-loop-terminating branch instruction within the current instance of executing the loop. If the current iteration of the predicated-loop-terminating branch instruction has not yet reached the expected run length then at step 128, the loop termination condition is predicted not to be satisfied. Again, this prediction is made independent of prediction state stored in the branch direction predictor 44 or the predicated loop prediction structure 48 which was obtained prior to the first iteration of the predicated-loop-terminating branch instruction within the current instance of the loop.

If at step 122, the lookup missed in the side structure 49, at step 130 the branch predictor 40 determines whether the lookup hits in the predicated loop prediction structure 48. If so, then at step 132 the branch predictor determines whether the matching entry of the predicated loop prediction structure 48 (that corresponds to the next instruction address and the current iteration of the loop reached so far) indicates that the loop is predicted to terminate at the current iteration. If so then at step 134 the branch predictor determines that the loop termination condition is satisfied. If the matching entry of the predicated loop prediction structure indicates that the current loop iteration is not predicted to terminate the loop then at step 136 the loop termination condition is predicted not satisfied and so the branch predictor 40 will control the fetch stage to fetch another iteration of the predicated loop body.

If at step 130 the lookup also missed in the predicated loop prediction structure 48, then at step 138 the branch direction is predicted based on lookups of the branch direction predictor 44, based on prediction state learned from previously seen instructions. The branch direction prediction may be made according to any known branch prediction technique.

In FIG. 11, regardless of which structure is used to predict the branch direction (the BDP 44, predicated loop prediction structure 48 or side structure 49), the target address if the branch is predicted taken can be determined based on the state stored in the branch target buffer 42, according to any known BTB techniques. For the predicated-loop-terminating branch instruction in the example shown in FIG. 2, the BTB may record an entry indicating that the predicted target address for that branch is the address of the branch itself indicating that the instruction branches to itself. For other examples where the predicated-loop-terminating branch instruction is a separate instruction from the instruction performing the predicated loop body, the BTB may learn from previous attempts at executing the loop that the predicted target address for the branch is the address at the start of the predicated loop body.

While FIG. 11 shows a certain sequence of operations, it will be appreciated that the same outcome could be achieved with a different order of operations. For example, some steps could be reordered or performed in parallel. In some examples, rather than looking up all the branch direction prediction structures 44, 48, 49 at step 120, the lookups could be performed sequentially so that if there is a hit in the side structure 49, the lookups to the predicated loop prediction structure 48 or branch direction predictor 44 can be suppressed to save power, or if there is a hit in the predicated loop prediction structure 48, the lookup to the branch direction predictor 44 can be suppressed to save power. The extent to which lookups are performed sequentially or in parallel can be an implementation choice for a particular processor implementation depending on whether power saving or performance is prioritised.

Figure 12A:
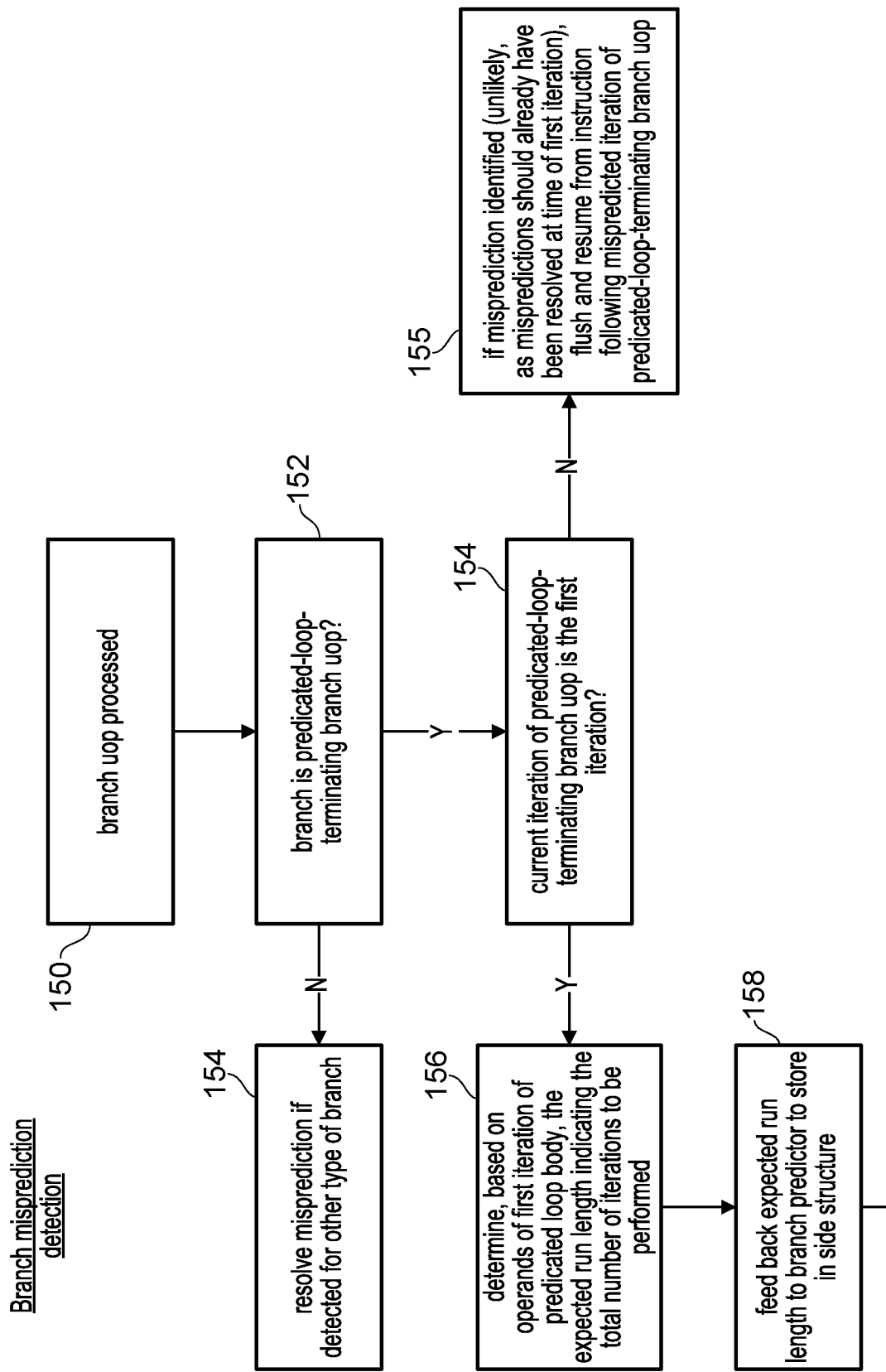
FIGS. 12A and 12B illustrate detection and handling of a branch misprediction.
Figure 12B:
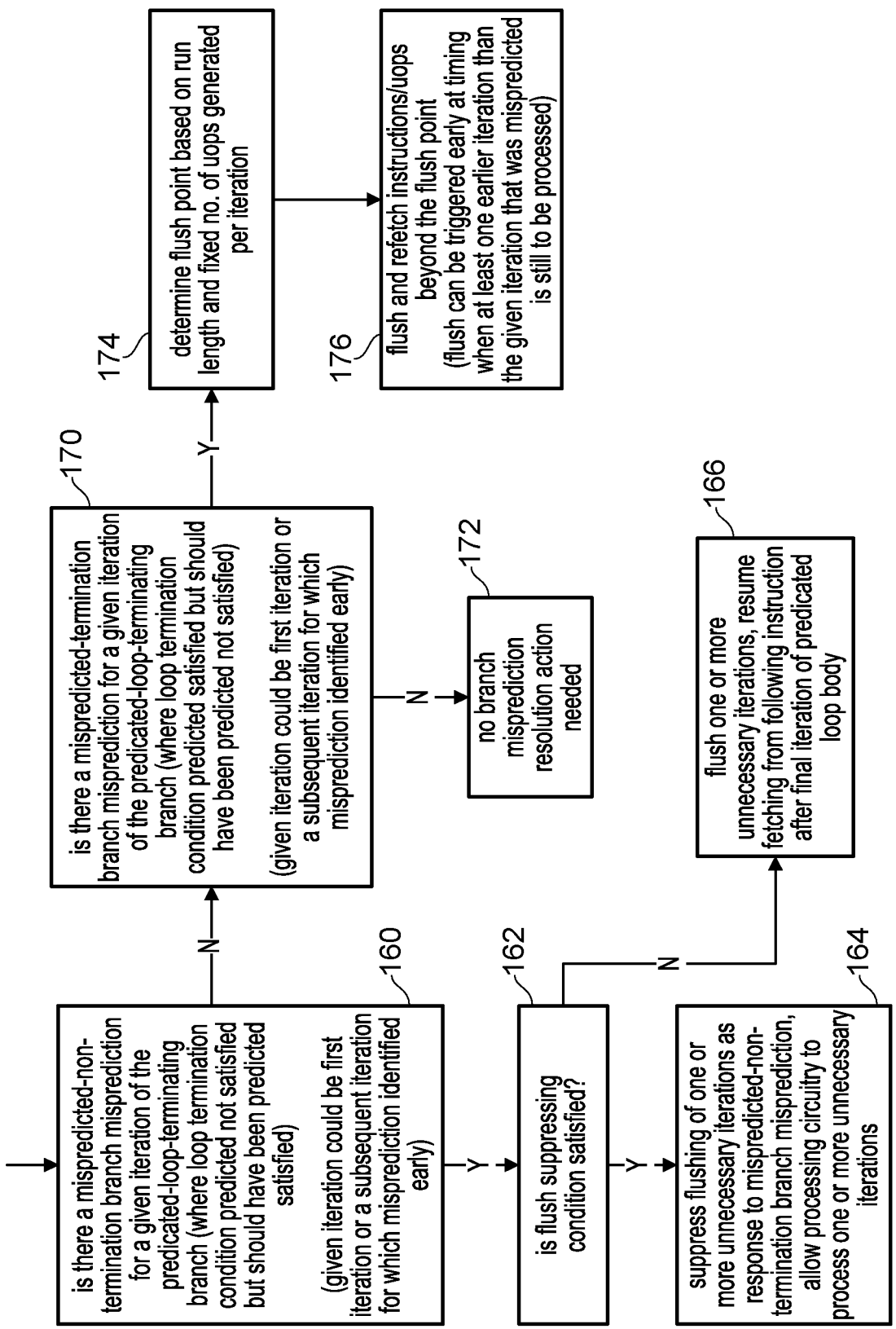

FIGS. 12A and 12B are a flow diagram illustrating steps performed by the branch misprediction detection circuitry 46 for detecting and responding to branch mispredictions. At step 150 of FIG. 12A, the branch unit 24 of the execute stage 16 processes a branch micro-operation. At step 152 the branch misprediction detection circuitry 46 determines whether the executed branch is a predicated-loop-terminating branch micro-operation (a micro-operation which has been decoded from a predicated-loop-terminating branch instruction). If the executed branch micro-operation is not a predicated-loop-terminating branch micro-operation then at step 154 the branch misprediction detection circuitry 46 resolves any detected misprediction according to any known branch misprediction resolution technique.

If the executed branch is a predicated-loop-terminating branch micro-operation then at step 154 the branch misprediction detection circuitry 46 determines whether the current iteration of the predicated-loop-terminating branch micro-operation is the first iteration (based on an iteration count maintained by the branch misprediction detection circuitry 46 or the branch predictor 40 to track the number of iterations seen so far for a program counter address identified to correspond to a predicated-loop-terminating branch micro-operation). If the current iteration is not the first iteration, then at step 155, if any misprediction is identified, the branch misprediction detection circuitry 46 flushes instructions or micro-operations from the pipeline which correspond to a point in program flow which is beyond the mispredicted branch, and controls the fetch stage 6 to resume fetching of instructions from the instruction which should have executed following the mispredicted iteration of the predicated-loop-terminating branch instruction. In practice, in implementations where the expected run length is stored in a side structure 49 in response to the first iteration of the loop, it is unlikely that a misprediction would be identified for an iteration other than the first iteration, as the stored expected run length can accurately predict the number of iterations required for subsequent iterations.

If the current iteration of the predicated-loop-terminating branch micro-operation is determined to be the first iteration, then at step 156 the branch misprediction detection circuitry 46 determines, based on operands of the first iteration of the predicated loop body, the expected run length indicating the total number of iterations to be performed for the loop as a whole. At step 158 the computed expected run length is fed back to the branch predictor 40 to store in the side structure 49.

At step 160, in FIG. 12B, the branch misprediction detection circuitry 46 determines whether, for the first iteration of the predicated loop, a mispredicted-non-termination branch misprediction is identified, which occurs when a given iteration of the predicated-loop-terminating branch instruction is predicted to not satisfy the loop termination condition when the loop termination condition should have been satisfied. The given iteration for which the misprediction is identified could be the current (first) iteration or could be a subsequent iteration (since the misprediction associated with a later iteration can be identified early based on the expected run length computed based on the operands of the first iteration).

If the mispredicted-non-termination branch misprediction is identified for a given iteration, then at step 162 the branch misprediction detection circuitry 46 determines whether a flush suppressing condition is satisfied. The flush suppressing condition may be considered satisfied if a condition is detected which indicates that the number of unnecessary loop iterations that would be executed after the given iteration before the loop is terminated is relatively low. The flush suppressing condition can be evaluated in various ways. For example, the expected run length determined at step 156 may be compared with a threshold and if the run length is less than the threshold then the flush suppressing condition may be considered to be satisfied. The threshold may be selected in consideration of the pipeline depth of the pipeline, so that the run length is typically less than the threshold if the number of iterations is such that the next instruction C after the loop terminates will already have been fetched if the condition is satisfied.

However, the flush suppressing condition could also be determined based on other parameters other than the expected run length. For example, the branch misprediction detection circuitry 46 may check whether the branch predictor 40 has already predicted the loop termination condition to be satisfied for a subsequent iteration, and so can predict the flush suppressing condition to be satisfied if the branch predictor 40 indicates that the loop termination condition has already been satisfied for a subsequent iteration of the loop. This helps to distinguish the short loop example of FIG. 5, when it can be beneficial to suppress flushing as the next instruction to be executed after the termination of the loop is already within the pipeline, from the long loop example of FIG. 8 when it would be preferable to initiate the flush so that the next instruction can be processed sooner.

Another way of evaluating the flush suppressing condition may be to check with the fetch stage 6 whether the following instruction C to be executed after termination of the loop has already been fetched at the point when the misprediction is identified, and if the following instruction has been fetched already then the flush suppressing condition can be determined to be satisfied, again allowing short loops with relatively few iterations to be distinguished from longer loops with a greater number of iterations.

Hence, regardless of how the flush suppressing condition is evaluated, if the flush suppressing condition is determined to be satisfied then at step 164 the branch misprediction detection circuitry 46 suppresses the flushing of one or more unnecessary iterations of the predicated loop body as a response to the mispredicted-non-termination branch misprediction, allowing the processing circuitry 16 to process the one or more unnecessary iterations which should not have been fetched. Such unnecessary iterations can be allowed to be processed regardless because the predication will stop the effects of those unnecessarily executed operations changing the architectural results of processing. On the other hand, if at step 162 the flush suppressing condition is determined not to be satisfied, then at step 166 the one or more unnecessary iterations of the predicated loop body are flushed from the pipeline and fetching of instructions by the fetch stage 6 resumes from the following instruction to be executed after the final iteration of the predicated loop body.

If at step 160 no mispredicted-non-termination branch misprediction was identified, then at step 170 the branch misprediction detection circuitry 46 detects whether there was a mispredicted-termination branch misprediction detected for a given iteration of the predicated-loop-terminating branch instruction/micro-operation. The mispredicted-termination branch misprediction is an occasion when the branch was predicted to terminate because the loop termination condition was determined to have been satisfied, but the loop termination condition should not have been predicted satisfied and so the loop should not have terminated yet. The given iteration for which the mispredicted-termination branch misprediction is identified could be the first iteration currently being processed or could be a subsequent iteration for which the misprediction is identified early. If no mispredicted-termination branch misprediction is identified, then at step 172 no branch misprediction resolution action is needed because any prediction made for the current iteration of the predicated-loop-terminating branch micro-operation will have been correct.

However, if the mispredicted-termination branch misprediction is detected for the given iteration, then at step 174 a flush point is determined based on the expected run length determined at step 156 and a value indicating the fixed number of micro-operations generated by the instruction decoder 10 in each iteration of the predicated loop. At step 176 the branch misprediction detection circuitry triggers a flush of the instructions or micro-operations which correspond to a point in program flow beyond the flush point, and controls the fetch stage 6 to resume fetching of instructions from the next instruction to be executed after the flush point (which, following a mispredicted-termination branch misprediction, should be another instance of an instruction corresponding to the predicated loop body). Note that this flush is triggered early, at a timing when at least one earlier iteration (earlier than the given iteration of the loop that was mispredicted) is still to be processed by the execute stage 16.

Figure 13:
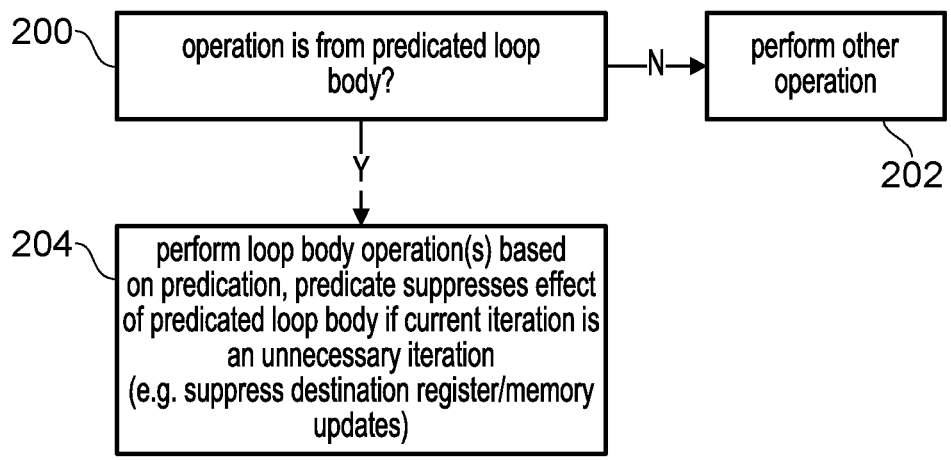
FIG. 13 illustrates processing of a predicated loop body.

FIG. 13 illustrates steps performed for processing of the predicated loop body. At step 200, the processing pipeline 4 (e.g. using the instruction decoder 10 or the execute stage 16) determines whether the operation to be processed is from the predicated loop body, and if not then another operation is processed at step 202. If the operation is from the predicated loop body then at step 204 the execute stage 16, under control of the instruction decoder 10, performs the loop body operation based on predication. The predication could suppress all, part or none of the effects of the loop body operation, depending on the number of bytes of data to be processed in the current iteration of the predicated loop body. If the current iteration is an unnecessary iteration executed following a mispredicted-non-termination branch misprediction, the predication will suppress the updating of destination registers and memory updates in response to the predicated loop body to hide architectural effects of the unnecessarily executed loop iteration. This provides the opportunity for the branch misprediction detection circuitry 46 to suppress flushing of the unnecessary iterations as discussed above.

Figure 14:
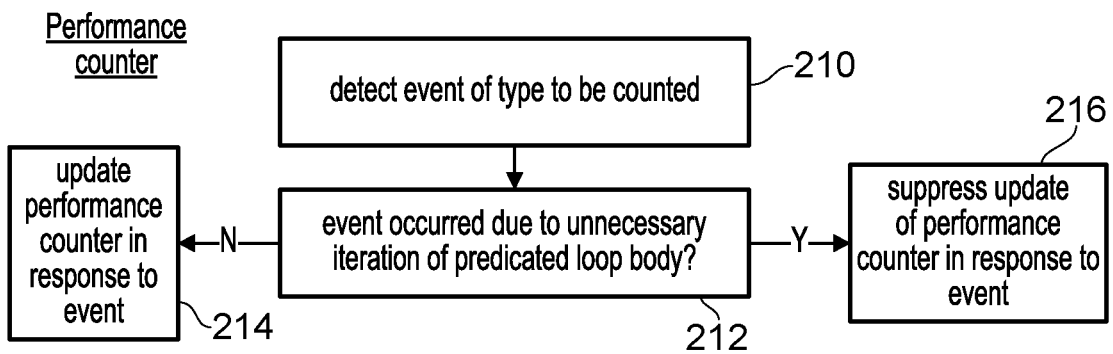
FIG. 14 illustrates control of performance monitoring.

FIG. 14 illustrates steps performed by the performance monitoring circuitry 52 to hide the fact that an unnecessary iteration of the predicated loop may have been executed. The performance monitoring circuitry 52 has a performance counter which is to be incremented each time an event of a given type occurs. A wide variety of events could be counted by the counter, such as cache misses, execution of a branch instruction, counting the total number of instructions executed by incrementing each time an instruction is executed, and so on. At step 210 the performance monitoring circuitry 52 detects an event of the type which is to be counted by the performance counter. When this event occurs then at step 212 the performance monitoring circuitry 42 determines whether the event occurred due to the unnecessary iteration of the predicated loop body, which should not have been executed, but was allowed to execute under predication following a mispredicted-non-termination branch misprediction. If the event did not occur due to an unnecessary iteration of the predicated loop body, then at step 214 the performance counter is updated in response to the detection of the event. If the event did occur due to the unnecessary iteration of the predicated loop body, then at step 216 the updating of the performance counting response to the event is suppressed.

Figure 15:
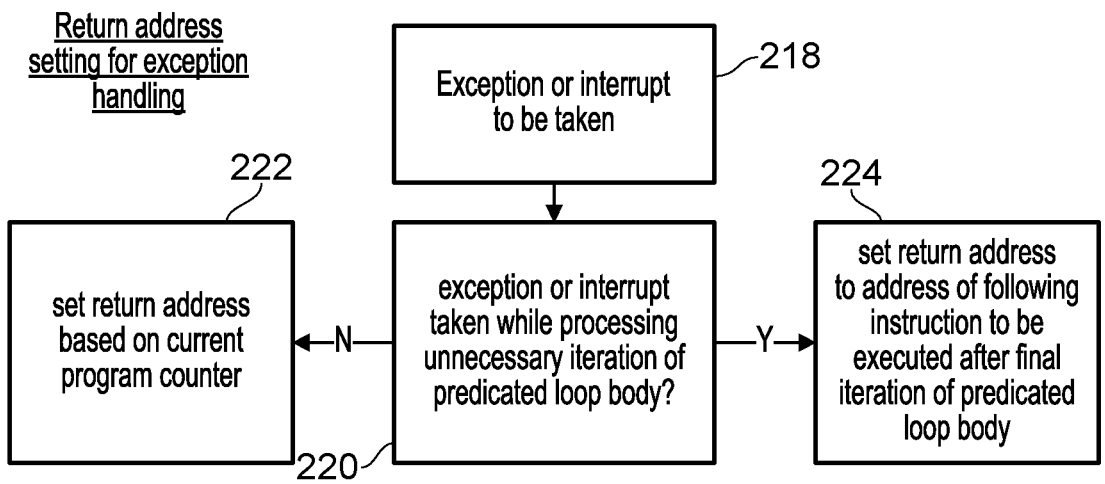
FIG. 15 illustrates return address setting for exception handling.

FIG. 15 illustrates steps performed by the exception handling circuitry 52 to hide the fact that an unnecessary iteration of the predicated loop may have been executed. At step 218 the exception handling circuitry 50 detects that an exception or an interrupt is to be taken. For example, this could be detected if a fault has arisen, for example due to the instruction decoder 10 encountering an undefined instruction, or the MMU 28 encountering an address fault. Also an interrupt may occur if an interrupt signal is asserted in hardware due to an external event occurring that is not related to the processing currently being performed by the pipeline 4, such as the user pressing a button on a device or a signal being received from an external device. At step 220 the exception handling circuitry 50 determines whether the exception or the interrupt was taken while processing an unnecessary iteration of the predicated loop body, and if this is not the case then at step 222 a return address is set based on the current program counter value which represents the point of program flow reached at the point when the exception or interrupt was taken. If the exception or interrupt was taken while processing unnecessary iteration of the predicated loop body, then at step 224 the exception handling circuitry 50 sets the return address to be the address of the following instruction to be executed after the final iteration of the predicated loop body (rather than the current program counter address which will indicate an address corresponding to the predicated loop body itself). By setting the return address to the address of the following instruction, this means that once handling of the exception of the interrupt is complete processing may then resume from the following instruction and so this prevents the execution of the unnecessary iteration becoming visible from program state which may have been saved in response to the exception or interrupt and may be visible after restoring following resumption of processing after the handling of the exception or interrupt.

Code for Fabrication of Apparatus

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
hardware processing circuitry to perform data processing in response to decoded instructions;
branch prediction circuitry to perform branch prediction to predict outcomes of branch instructions, and based on the branch prediction, to control fetching of instructions to be decoded for processing by the hardware processing circuitry; and
branch misprediction detection circuitry to detect branch misprediction for a predicated-loop-terminating branch instruction for controlling, based on whether a loop termination condition is satisfied, whether the hardware processing circuitry should process a further iteration of a predicated loop body or process a following instruction to be processed after a final iteration of the predicated loop body, for which, if at least one unnecessary iteration of the predicated loop body is processed following a mispredicted-non-termination branch misprediction when the loop termination condition is mispredicted as unsatisfied for a given iteration of the predicated-loop-terminating branch instruction when the loop termination condition should have been predicted satisfied, processing of the at least one unnecessary iteration of the predicated loop body is predicated to suppress an effect of the at least one unnecessary iteration of the predicated loop body; in which:
in response to detecting the mispredicted-non-termination branch misprediction for the given iteration of the predicated-loop-terminating branch instruction, the branch misprediction detection circuitry is configured to:
determine whether a flush suppressing condition is satisfied; and
in response to determining that the flush suppressing condition is satisfied, suppress flushing of the at least one unnecessary iteration of the predicated loop body as a response to the mispredicted-non-termination branch misprediction, to allow the hardware processing circuitry to continue to process the at least one unnecessary iteration despite the mispredicted-non-termination branch misprediction being detected.

2. The apparatus according to claim 1, in which the branch misprediction detection circuitry is configured to determine that the flush suppressing condition is satisfied when at least one of the following conditions is satisfied at a time when the mispredicted-non-termination branch misprediction is identified:
the branch misprediction detection circuitry determines that fewer than a predetermined number of unnecessary iterations of the predicated loop body will be processed after the given iteration for which the mispredicted-non-termination branch misprediction was detected; and/or the branch prediction circuitry has already predicted the loop termination condition to be satisfied for a subsequent iteration of the predicated-loop-terminating branch instruction after the given iteration; and/or the following instruction to be processed after the final iteration of the predicated loop body has already been fetched for processing by the hardware processing circuitry.

3. The apparatus according to claim 1, in which the effect of the at least one unnecessary iteration, which is suppressed when the at least one unnecessary iteration is predicated, comprises an update of at least one of:

data in memory; and/or at least one destination register.

4. The apparatus according to claim 1, comprising performance monitoring circuitry to maintain a performance counter indicative of a count of occurrences of a given event; and in response to detecting the mispredicted-non-termination branch misprediction when the flush suppressing condition is determined to satisfied, the branch misprediction detection circuitry is configured to control the performance monitoring circuitry to prevent occurrences of the given event arising due to processing of the one or more unnecessary iterations contributing to the count indicated by the performance counter.

5. The apparatus according to claim 1, comprising exception handling circuitry responsive to an exception being taken during processing of the at least one unnecessary iteration of the predicated loop body to set, as a return address from which program flow is to be resumed after processing of the exception, an address corresponding to the following instruction to be processed after the final iteration of the predicated loop body.

6. The apparatus according to claim 1, in which at least one of the hardware processing circuitry and the branch misprediction detection circuitry is configured to determine a total number of iterations of the predicated loop body required to be processed, based on operands associated with a first iteration of the predicated loop body.

7. The apparatus according to claim 6, in which the branch prediction circuitry is configured to predict, based on the total number of iterations determined using the operands associated with the first iteration of the predicated loop body, whether the loop termination condition is satisfied for at least one subsequent iteration of the predicated-loop-terminating branch instruction.

8. The apparatus according to claim 7, in which, for the at least one subsequent iteration of the predicated-loop-terminating branch instruction for which the prediction of whether the loop termination condition is satisfied is based on the total number of iterations, the branch prediction circuitry is configured to predict whether the loop termination condition is satisfied independent of branch direction prediction state associated with an address of the predicated-loop-terminating branch instruction that was obtained prior to encountering a first iteration of the predicated-loop-terminating branch instruction.

9. The apparatus according to claim 1, in which the branch misprediction detection circuitry is configured to perform early detection, based on operands associated with a first iteration of the predicated loop body, of whether there is a branch misprediction for one or more subsequent iterations of the predicated-loop-terminating branch instruction following a first iteration of the predicated-loop-terminating branch instruction.

10. The apparatus according to claim 9, in which in response to the early detection detecting a mispredicted-termination branch misprediction for a given subsequent iteration of the predicated-loop-terminating branch instruction for which the loop termination condition is mispredicted as being satisfied when the loop termination condition should have been predicted unsatisfied, the branch misprediction detection circuitry is configured to trigger, at a timing when at least one older iteration than the given subsequent iteration remains to be processed, an early pipeline flush of operations following the given subsequent iteration of the predicated-loop-terminating branch instruction.

11. The apparatus according to claim 10, comprising instruction decoding circuitry to decode fetched instructions to generate micro-operations to be processed by the hardware processing circuitry; in which:

the predicated loop body corresponds to a fixed number of micro-operations to be processed by the hardware processing circuitry, the fixed number being the same for each iteration of the predicated loop body.

12. The apparatus according to claim 1, in which the predicated loop body comprises operations to:

determine a variable number of bytes to be processed in a current iteration;

perform at least one processing operation based on the variable number of bytes determined for the current iteration, the at least one processing operation including at least one of a load operation and a store operation; and update, based on the variable number of bytes, a remaining bytes parameter indicative of a remaining number of bytes to be processed.

13. The apparatus according to claim 12, in which the loop termination condition for a given iteration of the predicated-loop-terminating branch instruction is satisfied when the remaining bytes parameter indicates that the number of remaining bytes to be processed is zero.

14. The apparatus according to claim 12, in which the variable number of bytes is dependent on alignment of a target address of said at least one of the load operation and the store operation with respect to an alignment boundary.

15. The apparatus according to claim 1, in which the predicated loop body comprises a memory copy operation to copy data from a first memory region to a second memory region.

16. The apparatus according to claim 1, in which the predicated loop body comprises operations to implement a string.h C library function.

17. The apparatus according to claim 1, in which the predicated-loop-terminating branch instruction is a combined instruction for controlling the hardware processing circuitry to perform both the predicated loop body and a conditional branch operation conditional on whether the loop termination condition is satisfied.

18. The apparatus according to claim 1, in which the predicated-loop-terminating branch instruction is separate from one or more instructions for controlling the hardware processing circuitry to perform the predicated loop body.

19. A method comprising:

performing branch prediction to predict outcomes of branch instructions, and based on the branch prediction, controlling fetching of instructions to be decoded for processing by processing circuitry;

in response to the decoded instructions, performing data processing using the processing circuitry;

detecting branch misprediction for a predicated-loop-terminating branch instruction for controlling, based on whether a loop termination condition is satisfied, whether the processing circuitry should process a further iteration of a predicated loop body or process a following instruction to be processed after a final iteration of the predicated loop body, for which, if an unnecessary iteration of the predicated loop body is processed following the loop termination condition being mispredicted as unsatisfied for an iteration of the predicated-loop-terminating branch instruction when the loop termination condition should have been predicted satisfied, processing of the unnecessary iteration of the predicated loop body is predicated to suppress an effect of the unnecessary iteration of the predicated loop body; and in response to detecting a mispredicted-non-termination branch misprediction for a given iteration of the predicated-loop-terminating branch instruction for which the loop termination condition is mispredicted as unsatisfied when the loop termination condition should have been predicted satisfied:

determining whether a flush suppressing condition is satisfied; and in response to determining that the flush suppressing condition is satisfied, suppressing flushing of one or more unnecessary iterations of the predicated loop body as a response to the mispredicted-non-termination branch misprediction, to allow the processing circuitry to continue to process the one or more unnecessary iterations despite the mispredicted-non-termination branch misprediction being detected.

20. A non-transitory computer-readable medium to store computer-readable code for fabrication of an apparatus comprising:

processing circuitry to perform data processing in response to decoded instructions;

branch prediction circuitry to perform branch prediction to predict outcomes of branch instructions, and based on the branch prediction, to control fetching of instructions to be decoded for processing by the processing circuitry; and branch misprediction detection circuitry to detect branch misprediction for a predicated-loop-terminating branch instruction for controlling, based on whether a loop termination condition is satisfied, whether the processing circuitry should process a further iteration of a predicated loop body or process a following instruction to be processed after a final iteration of the predicated loop body, for which, if an unnecessary iteration of the predicated loop body is processed following the loop termination condition being mispredicted as unsatisfied for an iteration of the predicated-loop-terminating branch instruction when the loop termination condition should have been predicted satisfied, processing of the unnecessary iteration of the predicated loop body is predicated to suppress an effect of the unnecessary iteration of the predicated loop body; in which:

in response to detecting a mispredicted-non-termination branch misprediction for a given iteration of the predicated-loop-terminating branch instruction for which the loop termination condition is mispredicted as unsatisfied when the loop termination condition should have been predicted satisfied, the branch misprediction detection circuitry is configured to:

determine whether a flush suppressing condition is satisfied; and in response to determining that the flush suppressing condition is satisfied, suppress flushing of one or more unnecessary iterations of the predicated loop body as a response to the mispredicted-non-termination branch misprediction, to allow the processing circuitry to continue to process the one or more unnecessary iterations despite the mispredicted-non-termination branch misprediction being detected.

* * * * *